United States Patent
Malatesta et al.

(10) Patent No.: US 9,674,366 B2
(45) Date of Patent: Jun. 6, 2017

(54) APPARATUS AND METHOD FOR TELEPHONE CALL PROCESSING

(71) Applicant: IP Integration Limited, Reading (GB)

(72) Inventors: Louie Malatesta, Reading (GB); Stephen Murray, Reading (GB); Bernard Prentis, Reading (GB)

(73) Assignee: IP Integration Limited, Reading (GB)

( * ) Notice: Subject to any disclaimer, the term of this patent is extended or adjusted under 35 U.S.C. 154(b) by 0 days.

(21) Appl. No.: 15/191,075

(22) Filed: Jun. 23, 2016

(65) Prior Publication Data

US 2017/0006163 A1    Jan. 5, 2017

(30) Foreign Application Priority Data

Jul. 2, 2015   (GB) .................................. 1511644.5
Nov. 9, 2015   (GB) .................................. 1519703.1

(51) Int. Cl.
*H04M 3/00*   (2006.01)
*H04M 3/58*   (2006.01)
(Continued)

(52) U.S. Cl.
CPC ............ *H04M 3/58* (2013.01); *G06Q 20/305* (2013.01); *H04M 3/4283* (2013.01);
(Continued)

(58) Field of Classification Search
CPC ......... H03M 3/51; H04M 3/58; H04M 3/5166
(Continued)

(56) References Cited

U.S. PATENT DOCUMENTS 6,862,343 B1   3/2005   Vacek
8,275,115 B1   9/2012   Everingham et al.
(Continued)

FOREIGN PATENT DOCUMENTS

EP   2775687 A1   9/2014
GB   2517695 A    8/2013

OTHER PUBLICATIONS

Search Report for Application No. GB1519703.1, dated Jan. 18, 2016.
(Continued)

*Primary Examiner* — William Deane, Jr.
(74) *Attorney, Agent, or Firm* — Sean D. Detweiler, Esq.; Morse, Barnes-Brown & Pendleton, P.C.

(57) ABSTRACT

A telephone call processing apparatus for a telephone system includes an exchange for receiving incoming telephone calls and switching said calls to selected respective agent workstations. The apparatus includes a routing function for connecting an incoming call from a caller to an agent workstation, and initiating a call from said apparatus to an external application platform, said call including data to enable a transaction call to be set up between said caller and said external application platform. A holding function maintains a call leg connection with said agent workstation whilst said call from said apparatus to said external application platform is initiated. A connection function connects a call from said external application platform to said agent workstation and establishing or maintaining a connection between said caller and said agent workstation for use whilst said transaction call is connected.

20 Claims, 27 Drawing Sheets

(51) Int. Cl.
*H04M 3/51* (2006.01)
*G06Q 20/30* (2012.01)
*H04M 3/428* (2006.01)
*H04M 7/12* (2006.01)

(52) U.S. Cl.
CPC ....... *H04M 3/5166* (2013.01); *H04M 3/5183* (2013.01); *H04M 7/1295* (2013.01); *H04M 2203/5018* (2013.01); *H04M 2203/5027* (2013.01); *H04M 2203/6009* (2013.01)

(58) Field of Classification Search
USPC ....... 379/265.01–265.14, 266.01–266.1, 309
See application file for complete search history.

(56) References Cited

U.S. PATENT DOCUMENTS

| | | |
|---|---|---|
| 8,831,204 B1 | 9/2014 | Pycko et al. |
| 9,379,909 B2 * | 6/2016 | Lee ................... H04L 12/5692 |
| 2005/0123105 A9 * | 6/2005 | Holt ................... H04M 3/533 379/88.17 |
| 2006/0050658 A1 | 3/2006 | Shaffer |

OTHER PUBLICATIONS

International Search Report for Application No. PCT/GB2016/051669, dated Oct. 11, 2016.

\* cited by examiner

4) A DTMF Code is Sent From the CTI Enabled Desktop Application (*1234#) This is Detected by the Network Which Drops the Leg of the Call to the Contact Centre. The Agent Remains Connected to the ODA 5) A DTMF Code is Sent From the CTI Enabled Desktop Application (*1234#) This is Detected by the SBC Which Drops the Leg of the Call to the PBX. The Agent Remains Connected to the ODA.

4a) At the Point of Taking Card Details a Desktop Application Spots What is Happening and Initiates a Conference Call With the Local ODA Server Via CTI 5) A DTMF Code is Sent From the CTI Enabled Desktop Application (*1234#) This is Detected by the SBC Which Drops the Leg of the Call to the PBX. The Agent Remains Connected to the ODA.

A DTMF Code is Sent From the CTI Enabled Desktop Application. This is Detected by the ODA. The Agent Remains Connected to the ODA.

6. A Sip Re - invite From the ODA Sends the Call to a Predetermined Destination.

7. The Hosted IVR Sends the Call to a New DDI Number Where the Call is Directly Presented Back to the ODA, Allowing the ODA to Connect the Caller Back to the Original Waiting Agent.

* DTMF to Signal the 'Unwind' is Sent From the CTI Desktop Application, and Causes the ODA to Drop the Loop to the Hosted IVR.

APPARATUS AND METHOD FOR TELEPHONE CALL PROCESSING

RELATED APPLICATION(S)

This application claims priority to, and the benefit of, co-pending United Kingdom Patent Applications No. GB 1511644.5 filed Jul. 2, 2015 and GB 1519703.1 filed Nov. 9, 2015 for all subject matter contained in said applications. The disclosures of said applications are hereby incorporated by reference in their entirety.

FIELD OF THE INVENTION

This invention relates generally to an apparatus and method for telephone call processing, particularly but not necessarily exclusively for use within a contact centre consisting of agents and respective telephone lines. Systems are described in which a call between a first party and an agent can, as part of a contact centre work flow, be transferred to a software application, either hosted or on-site, such that the first party can interact with the software application via their telephone connection, without disconnecting the agent from the work flow.

BACKGROUND

There is increasing and widespread use of contact centres, also known as call centres, by businesses and organisations for providing services to existing and potential customers. A contact centre is, typically, a large, centralised facility in the form of a call switching centre, wherein each agent has a workstation that includes a computer and a telephone device connected to a telecom switch. Increasingly, voice and data pathways into the centre are linked through computer telephony integration (CTI), which encompasses automatic call routing, etc. Many contact centres are configured to provide an incoming caller with access to many different services and resources, including those hosted by third parties, and the work flow employed for a respective caller will be dependent on the specific service/resource they require, often ascertained by an agent during an initial portion of an incoming call.

For example, after speaking to an agent for a period of time, an incoming caller may be required to complete a financial transaction, which requires the caller to provide items of personal data such as credit and debit card numbers, bank account information, date of birth, alphanumeric passwords, and the like. Such sensitive information, if compromised, can be used in criminal activity such as identity fraud and theft and, as such, security within, at least some, contact centre work flows is a key consideration. In general, businesses that engage in financial transactions are required to be compliant with PCI Security Council standards, which require all security risks within the scope of the business to be assessed and mitigated. Thus, the more security risk deemed to be within the scope of the business, the greater will be the onus on the business (and associated cost) of mitigating that risk.

In order to limit the security risk to the business, a third party hosted software application may be employed for the purposes of supporting operations such as financial transactions, and the agent may be provided with the facility to transfer a call to such an application as required within the contact centre workflow. However, in most cases, the agent will be required to guide the caller through the financial transaction, or at least be able to view its progress and outcome, as well as return to the call when the transaction has been completed, and as such the agent needs to actively remain on the call whilst the financial transaction is taking place. Indeed, there are several circumstances in which a contact centre may be required to provide the facility to connect some callers to a third party/hosted application, whether on- or off-site and, in many cases, the agent may be required to remain connected to the call and/or return to the call when the caller has completed their interaction with the hosted application.

As a result, known contact centre systems employ one-to-one mapping of agent workstations to a third party software application. In other words, if there are 100 agents, then the software application must have 100 respective dedicated ports to enable incoming calls to be mapped, as required, to the application. Thus, the application functionality is effectively provided to 100% of callers for 100% of each call, which results in a large element of redundancy within the system, especially for applications that may not be used by every caller and may only represent a very small proportion of the total time of an incoming call. This also has a significant cost implication when it is required to increase the capacity of the contact centre.

SUMMARY

Aspects of the present invention are intended to address at least some of these issues and, in accordance with a first aspect of the present invention, there is provided a telephone call processing apparatus for a telephone system comprising an exchange for receiving incoming telephone calls and switching said calls to selected respective agent workstations, the apparatus comprising:

a routing function for connecting an incoming call from a caller to an agent workstation, and initiating a call from said apparatus to an external application platform, said call including data to enable a transaction call to be set up between said caller and said external application platform;

a holding function for maintaining a call leg connection with said agent workstation whilst said call from said apparatus to said external application platform is initiated; and a connection function for connecting a call from said external application platform to said agent workstation and establishing or maintaining a connection between said caller and said agent workstation for use whilst said transaction call is connected.

In an exemplary embodiment, the routing function may be provided by an on demand application module located remotely from said exchange and said agent workstations. The on demand application module may be configured to set up said transaction call and maintain a call leg between said on demand application module and said agent workstation whilst said transaction call is set up. The on demand application module may be configured to receive a new call from said external application platform in response to said transaction call and connect said external application platform to said agent workstation.

The apparatus may comprise a conferencing module for supporting a conference call between said caller and said agent workstation.

In an exemplary embodiment, the routing function may be further configured to cause said incoming call to be terminated, whilst retaining a connection between said apparatus and said agent workstation. The initiated call from said apparatus to said external application platform may include ID data representative of said agent workstation.

The apparatus may be configured to receive data representative of an interaction between said caller and said external application platform provide said data to said agent workstation. In this case, the data representative of an interaction between said caller and said external application platform may comprise selected portions of data configured to maintain security of said interaction data. The interaction data may be provided by the caller to the external application platform in the form of DTMF and said data representative of said interaction excludes said DTMF.

The apparatus may be configured to initiate a call to said external application platform in response to receipt of an initiation signal indicative that an interaction between said caller and said external application platform is required. The apparatus may be configured, when an interaction between a caller and said external application platform has concluded, to resume control of the connection between said caller and said external application platform and route said call back to said agent workstation.

In accordance with another aspect of the present invention, there is provided a telephone system comprising a plurality of agent workstations and apparatus substantially as described above.

In an exemplary embodiment of the above-mentioned system, in response to connection of an incoming call thereto, an agent workstation may be configured to place a call to said apparatus to establish a connection therebetween. In this case, in response to receipt of a control signal, the agent workstation may be configured to place a call to said apparatus to establish a connection therebetween. The control signal may be generated in response to a user action.

The system may comprise a work flow monitor associated with an agent workstation, wherein said work flow monitor is configured to monitor progress of a work flow in respect of a respective agent workstation and, at an appropriate point therein, generate said control signal.

The external application platform may initiate a call back to said apparatus and transmit data representative of said interaction between said caller and said external application platform to said agent workstation.

The external application platform may be configured to exclude selected features of original interaction data for transmission to said apparatus, so as to maintain security thereof.

The apparatus may be configured, when an interaction between a caller and said external application platform has concluded, to resume control of the connection between said caller and said external application platform and route said call back to said agent workstation.

In accordance with yet another aspect of the present invention, there is provided a method for telephone call processing in a telephone system comprising an exchange for receiving incoming telephone calls and switching said calls to selected respective agent workstations, the method comprising: connecting an incoming call from a caller to an agent workstation, and initiating a call from said apparatus to an external application platform, said call including data to enable a transaction call to be set up between said caller and said external application platform; maintaining a call leg connection with said agent workstation whilst said call from said apparatus to said external application platform is initiated; and connecting a call from said external application platform to said agent workstation and establishing or maintaining a connection between said caller and said agent workstation for use whilst said transaction call is connected.

The above-mentioned method may further comprise causing said incoming call to be terminated, whilst retaining a connection between said apparatus and said agent workstation.

BRIEF DESCRIPTION OF THE FIGURES

These and other aspects of the present invention will be apparent from the following specific description, in which embodiments of the present invention are described, by way of examples only, and with reference to the accompanying drawings, in which.

DETAILED DESCRIPTION

Figure 1:
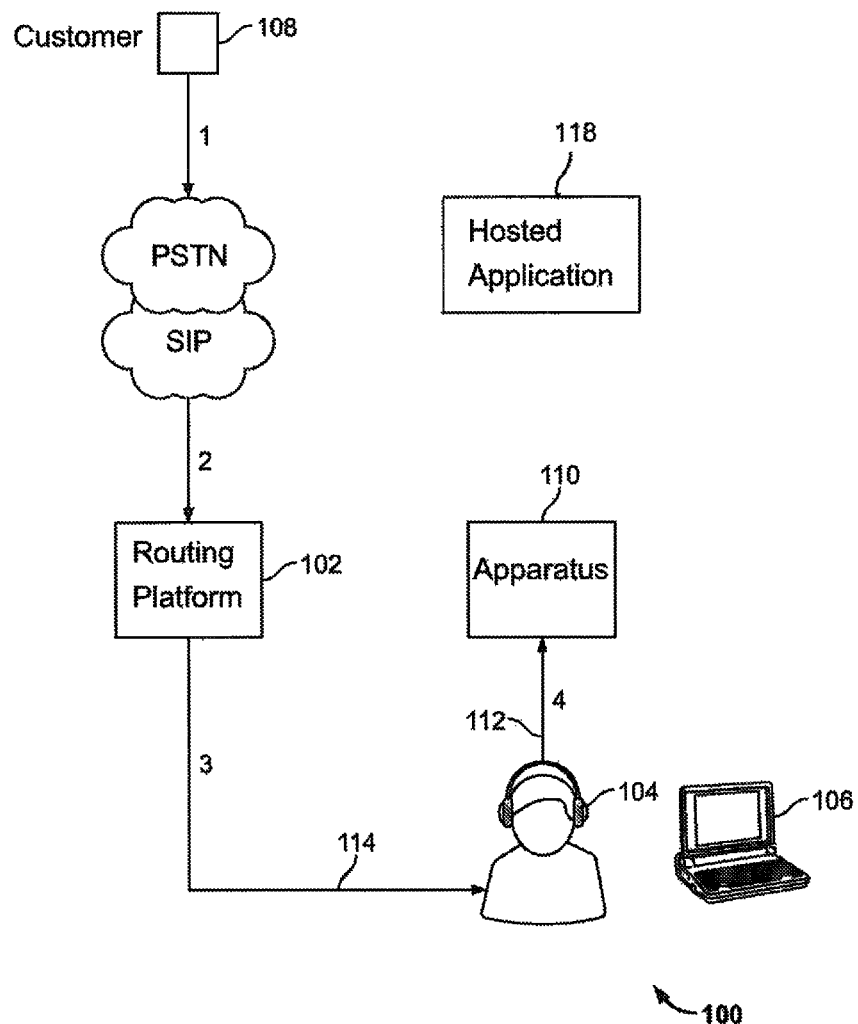
FIGS. 1, 2, 3, and 4 are schematic block diagrams illustrating the general configuration and mode of operation of a system according to an exemplary embodiment of the present invention.

Exemplary embodiments of the invention provide a method and apparatus for telephone call processing, that allows an organisation to seamlessly manage calls within a contact centre call flow, enabling the identification of calls that need to be routed to a third party application (whether hosted or on the premises), management of the routing of such calls to the third party application, and, if required, returning such routed calls back to the contact centre work flow, whilst maintaining a single view (for data recordal purposes) of the customer transaction.

A typical contact centre structure comprises a plurality of agent workstations 100 and a contact centre routing platform 102, in the form of a local PBX (private branch exchange). Each agent 100 is provided with a telephone device (in this case, a headset 104) connected to a telephone switch, and a computer 106 including a screen. In use, a customer 108 dials into the contact centre, using a central telephone number, via a PSTN (Public Switched Telephone Network) and is connected, via a call setup protocol such as SIP (Session Initiation Protocol), to the routing platform 102. The routing platform 102 then connects the call, via a local line, to an available agent 100.

Apparatus 110 according to an exemplary embodiment of the present invention is provided centrally, i.e. in respect of multiple agents 100. Once an incoming call has been connected to an agent, a call 112 is made from the agent's telephone device 104, via the local PBX 102, to the apparatus 110. This may occur automatically, when the incoming call is connected to an agent, but is more preferably effected if and when it is required to connect a caller to a hosted application. In this case, a CTI desktop module may be configured to monitor the progress of the call work flow, identify that the work flow has reached a point where the caller needs to be connected to a hosted application, and generate an initiation signal to cause the call 112 to the apparatus 110 to be made. In response to the call 112 from the agent's device, the apparatus 110 obtains and stores data representative of the agent to which it is connected, sufficient to enable it to manage the call correctly later on in the work flow. Depending on the nature of the incoming call, the agent will process the call and enter an appropriate work flow via their computer.

Figure 2:
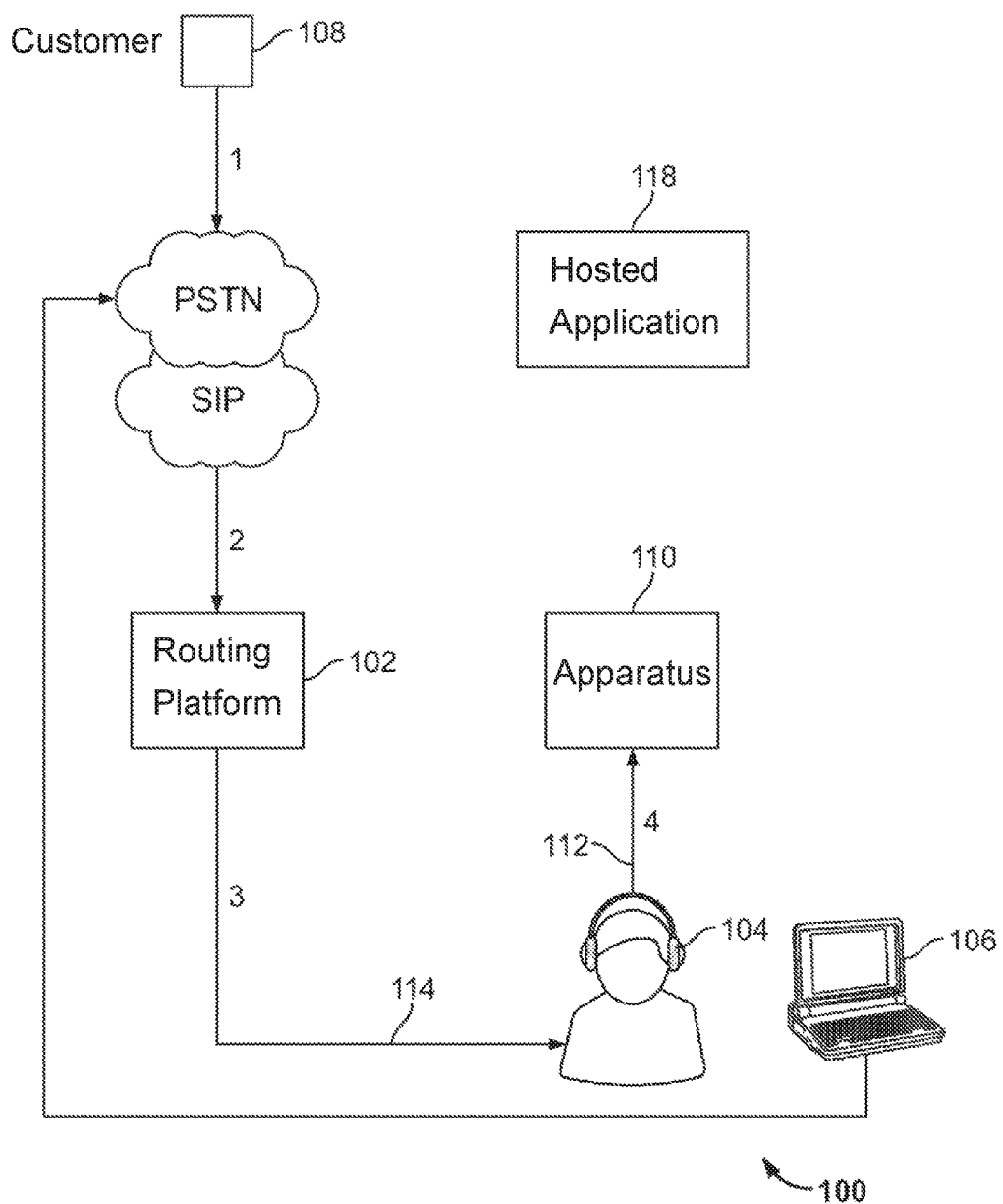
Figure 3:
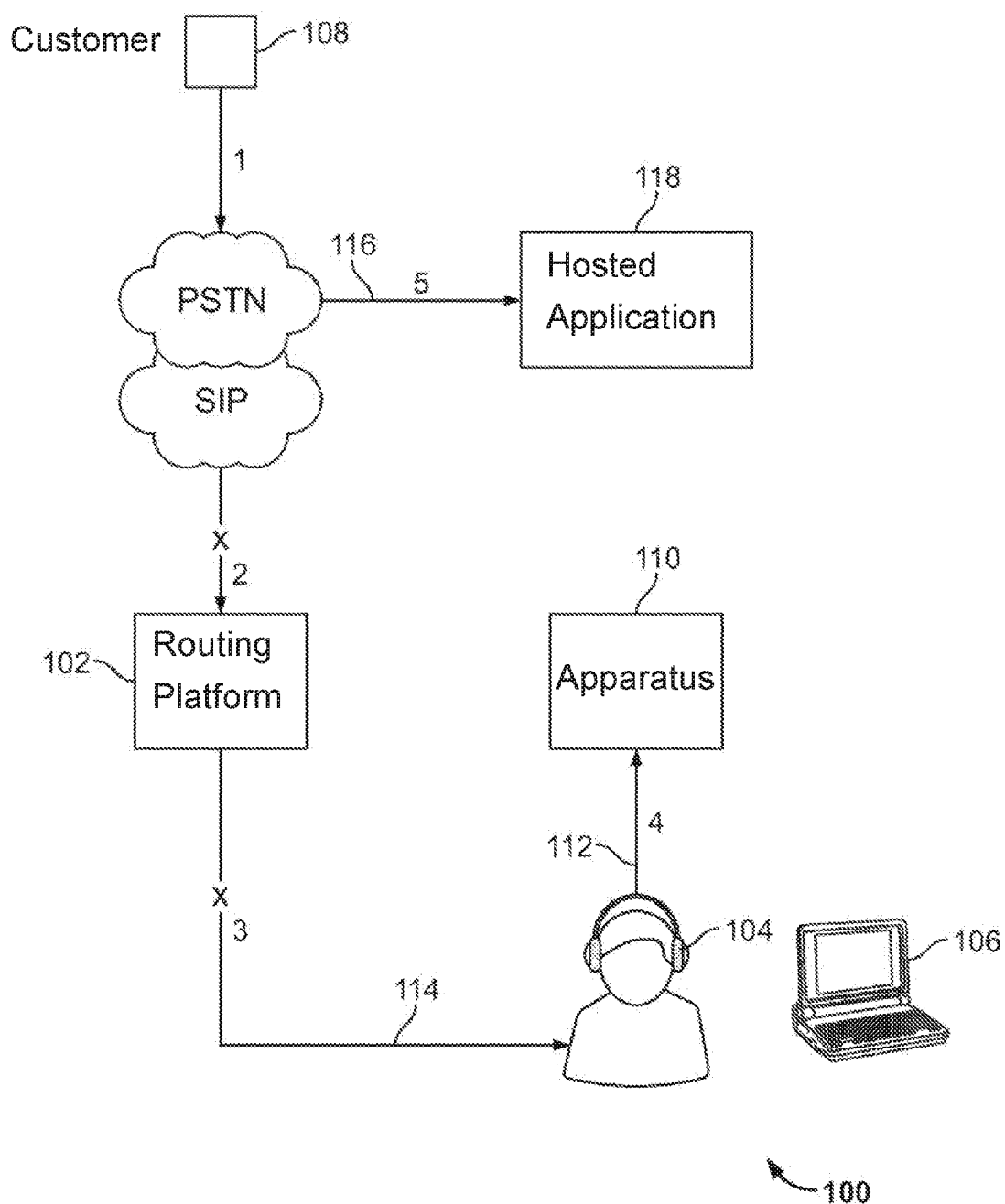

Referring to FIG. 2 of the drawings, if the work flow requires that the caller interacts with a third party/hosted application; for example, that a financial transaction is required to be performed or an automated customer survey is required to be completed; the work flow running on the agent's computer transmits an initiation signal 113 to the PSTN. Referring to FIG. 3 of the drawings, the PSTN, in response thereto, terminates the external call 114 and initiates a call 116 to the hosted application, including data required by the hosted application 118 to identify the interaction/transaction required to be performed thereby and, importantly, data identifying the original call to which it relates. It will be appreciated that the hosted application 118 may be located remotely, or may be located on the contact centre premises, and the present invention is not necessarily intended to be limited in this regard.

Thus, once the call 116 to the hosted application 118 has been initiated, the original call 114 can be terminated; in other words, the local line between the routing platform 102 and the agent 100 and the external line between the caller and the routing platform 102 are released, as shown in FIG. 3 of the drawings; and, for the duration of the caller's interaction with the hosted application 118, those resources are not tied up, which is highly beneficial as there are significant cost implications for tying up resources on the routing platform unnecessarily. On the other hand, the agent call 112 remains connected to the apparatus 110, which has the benefits of, not only retaining the agent's availability to return to the original call, but also ensures that the whole call is viewed by the system as a single call/agent interaction for the purposes of recordal of management information system (MIS) statistics. In other words, the entire interaction with the customer is seen as a single record within the Management Information platform of the contact centre routing platform, despite the fact the call has been released to an external hosted application for some of its duration.

Figure 4:
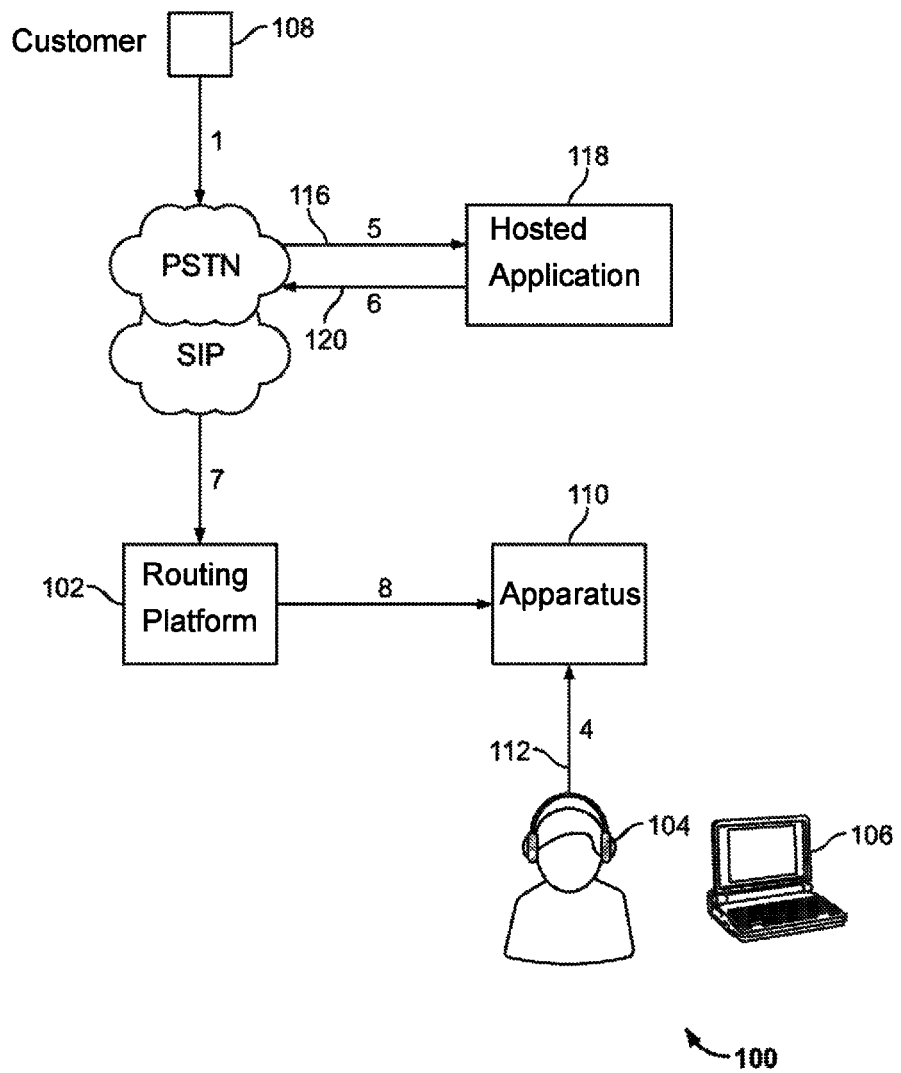

Referring to FIG. 4 of the drawings, the hosted application 118, places a call 120 back to the apparatus 110, indicating in the call setup the original call to which it relates. Thus, the apparatus 110 can use that data to identify the original call and associated agent, and place the call in conference with the retained agent call 112. The caller can perform the interaction with the hosted application using, for example, DTMF, which is transmitted over the line 116. However, the DTMF can be stripped out of the data transmitted back to the apparatus 110 (and to the agent's computer) such that the progress of the transaction may simply be displayed as symbols, say, on the agent's computer screen as the data is entered. As a result, the agent can follow the progress of the interaction/transaction, without any sensitive data being transferred into the contact centre system, thus significantly limiting the scope of its PCI compliance requirements.

It will be appreciated that, in some exemplary embodiments of the invention, the hosted platform may comprise a function with which the caller is required/wishes to interact at the end of, rather than during, a call work flow. For example, the hosted platform may comprise an automated customer survey function and, once the caller has completed the survey, the call can be ended rather than taken back by the apparatus 110 and transferred back to the original agent. In this case, the transfer to the hosted platform may occur as a result of a user selection, for example, at the beginning of the call, in which case the CTI workstation monitoring the call work flow may identify the end of the agent interaction within the workflow and initiate the above-described process. Alternatively, such initiation may occur as a result of an agent action. Either way, when the interaction between the caller and the hosted platform has been completed, the call therebetween will end and does not need to be transferred back to the original agent.

However, in the case of, for example, a payment platform, wherein interaction therewith occurs during a work flow, the caller may need to be re-connected to the original agent after a transaction. In this case, when the interaction/transaction with the hosted application 118 has been completed, the agent or desktop CTI application can again signal to the PSTN to take the call back. The PSTN will drop 116 which, in turn, will drop the call leg from the hosted application back to the PBX 102 and the apparatus 110. The PSTN will then re-present the call to the PBX 102, which will route the call to the apparatus 110, where data will be provided by the PSTN to allow the call to be conferenced with the correct, waiting agent, as before, so that the remaining work flow can be completed by the agent.

Figure 2A:
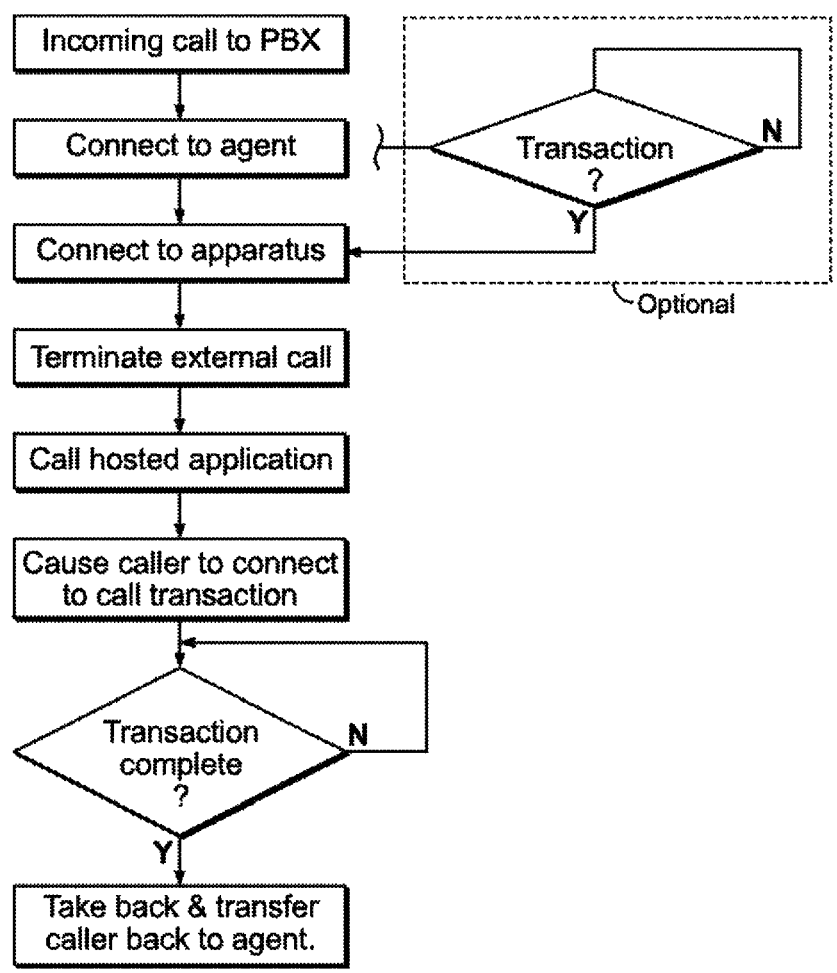
FIG. 2A is a schematic flow diagram illustrating a method according to an exemplary embodiment of the present invention.

Referring to FIG. 2A of the drawings, the principal steps of a method according to an exemplary embodiment of the present invention, and as described above, is illustrated schematically in the form of a flow chart.

A method according to an exemplary embodiment of the present invention has been described generally above. In the following, specific implementations will be described, by way of examples only, but it will be appreciated that other implementations within the scope of the invention as claimed, are envisaged, and the present invention is not necessarily intended to be limited in this regard.

Figure 5A:
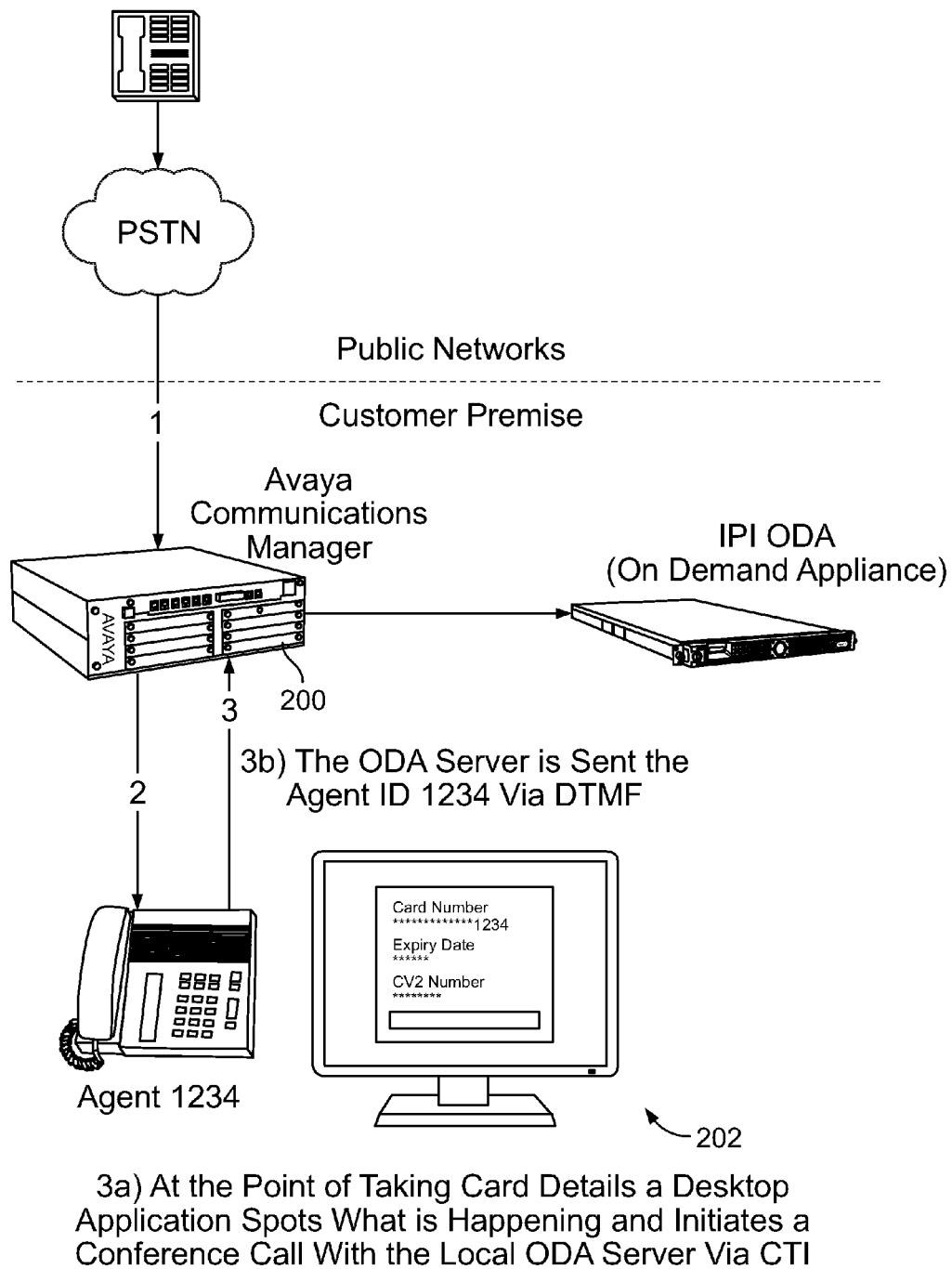
FIGS. 5A, 5B, 5C, 5D, 5E, and 5F are schematic diagrams illustrating the general configuration and mode of operation of a system according to a first exemplary implementation of the present invention.
Figure 5B:
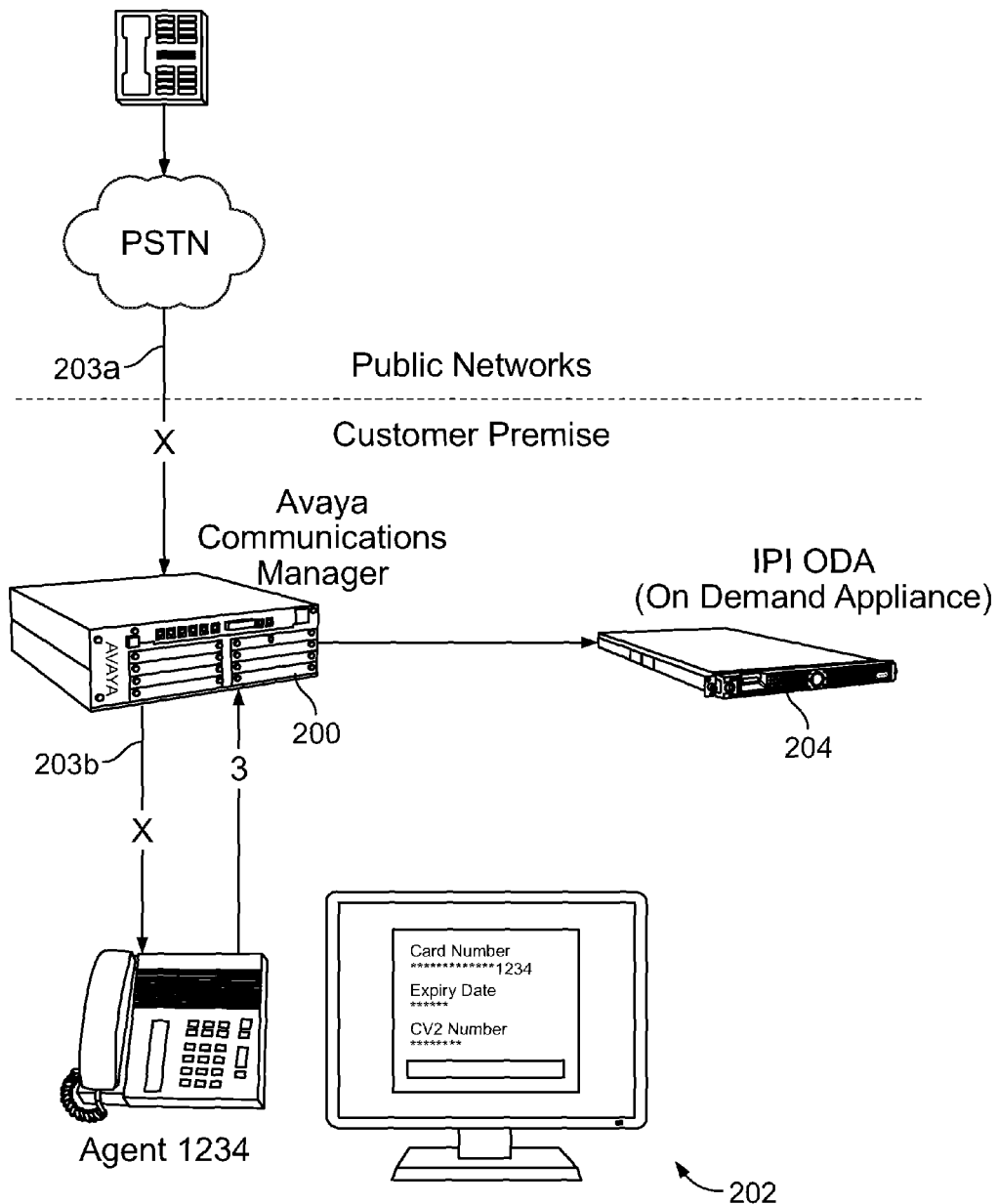

Thus referring to FIG. 5A of the drawings, the contact centre may comprise a communications manager 200, in the form of a PBX, and a plurality of agents (only one 202 shown). Inbound external calls are presented by the PSTN to the PBX 202, which routes inbound calls to agents in any known manner. Referring to FIG. 5B of the drawings, the agent handles the call in a normal manner until they are ready to accept payment from the caller. At this point, a CTI enabled desktop application (not shown) identifies agent activity within a defined work flow and, by using CTI, initiates a conference call to apparatus according to an exemplary embodiment of the present invention, referred to hereinafter as an on-demand appliance (ODA) 204. The ODA 204 answers the call and receives agent identification data via DTMF or other means, to allow it to identify the agent. This data is sent automatically from the desktop application.

Figure 5C:
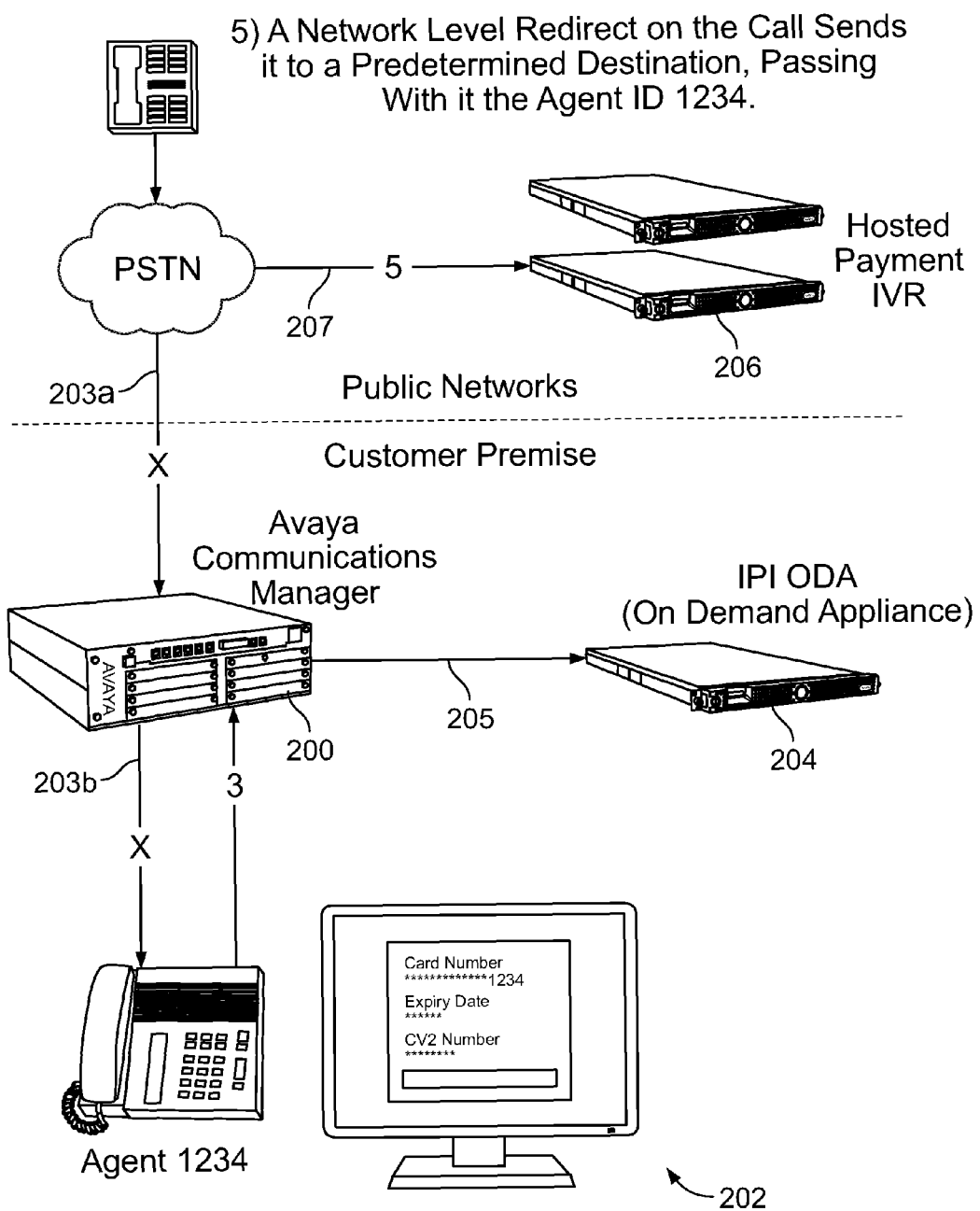
Figure 5D:
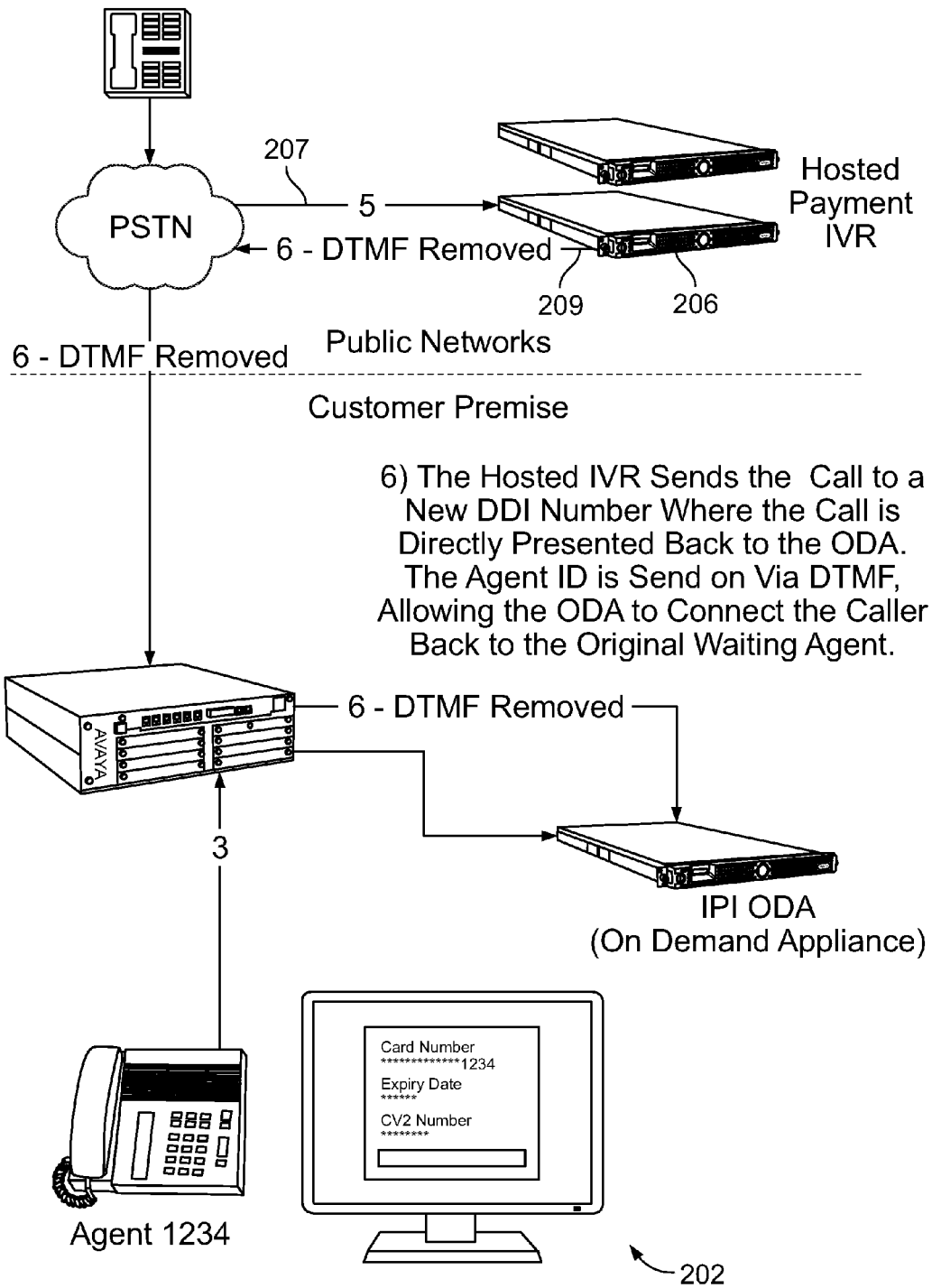

Referring to FIG. 5C of the drawings, a network level redirect function sends the inbound call to a new number, such that the call 207 is presented to a hosted platform, such as an IVR (Interactive Voice Response) platform 206. At this point, the original call 203a, 203b is released. Referring to FIG. 5D of the drawings, the hosted IVR 206 creates a new call 209 back to the call centre, but this time on a separate DDI that is routed directly, by the PBX 202, to the ODA 204. The ODA 204 answers the call and the hosted IVR 206 sends the original agent ID via DTMF. The ODA 204 matches the agent ID to the other call leg with matching agent ID and creates a two-party conference, allowing the agent and the customer to talk freely.

Figure 5E:
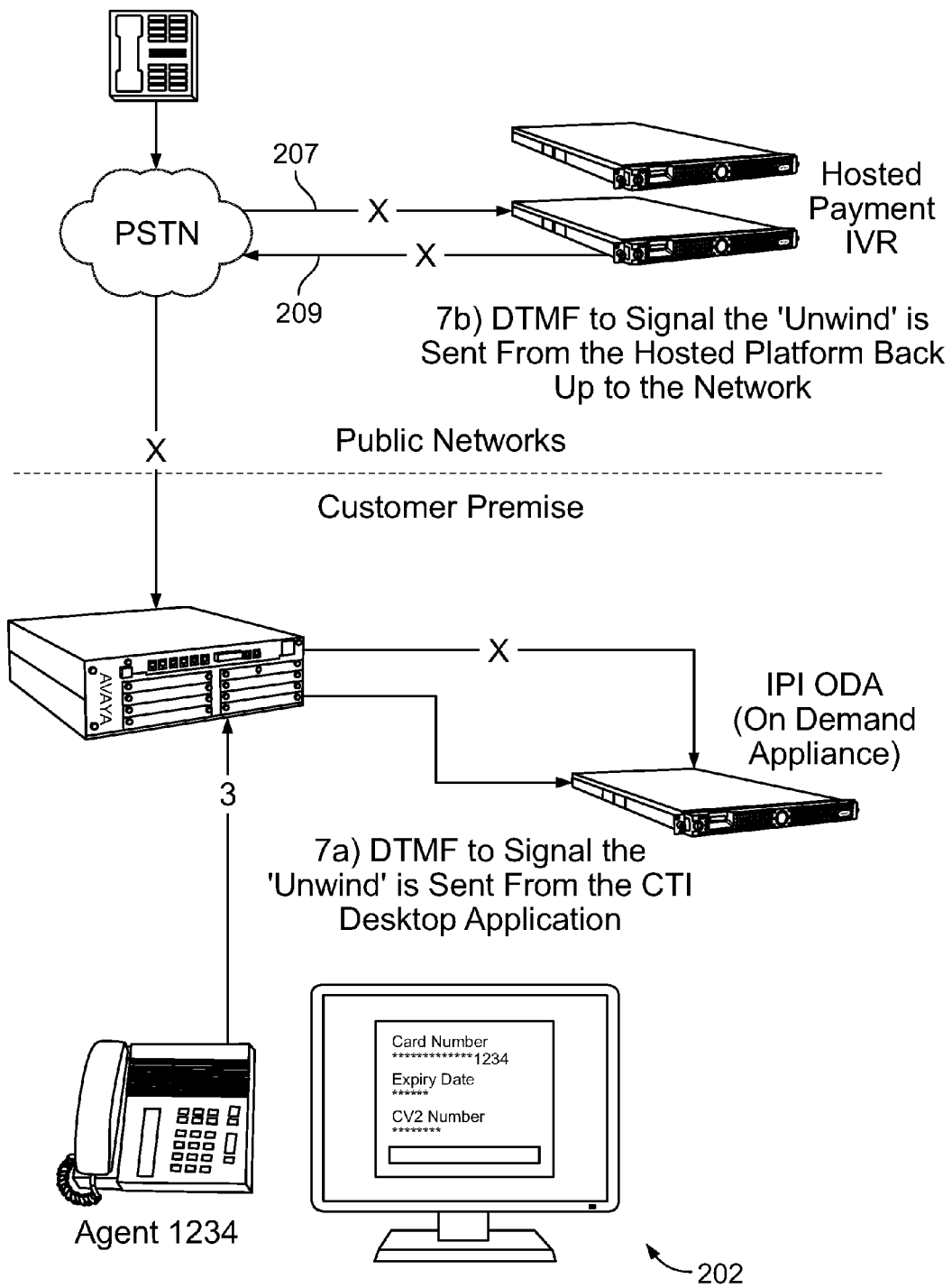

All customer-entered DTMF is removed at the hosted IVR level, allowing the contact centre to remain outside of PCI scope. Once the transaction is complete, the call may end, but should it need to continue, or the caller needs to be transferred or passed to an automated system, the system is configured to 'unwind' the call from the hosted payment IVR 206, which is filtering out DTMF. Referring to FIG. 5E of the drawings, the agent can initiate the 'unwind' function using a button on the above-mentioned CTI desktop application, or this could be automated by the CTI application being configured to monitor the transaction and identify when it has been completed. Either way, and in an exemplary embodiment:

a) The desktop application puts a sequence of DTMF on the line, to signal the unwind;
b) This sequence is detected by the hosted payment IVR 206 which, in turn, signals back up the trunk to the network; and
c) The network detects the signal and drops the call 207 to the hosted IVR 206. In turn, the call 209 from the hosted IVR 206 is also dropped.

Figure 5F:
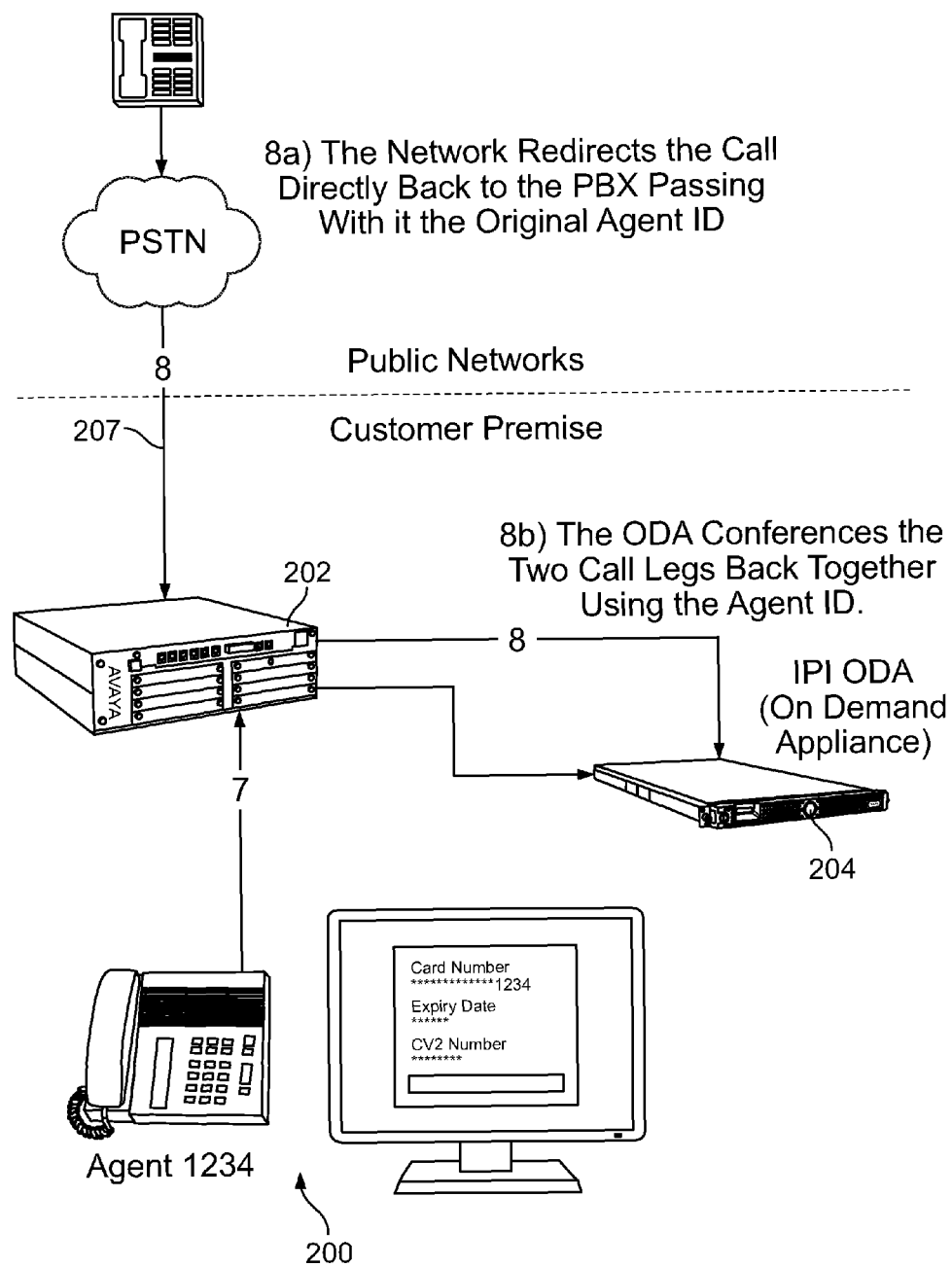

Finally, and referring to FIG. 5F of the drawings, a network level redirect sends the call 207, including the agent ID in DTMF format, directly back to the PBX 202 on a DDT that will be routed directly to the ODA 204 (this may be the same DDI as was used for the original call to the ODA, but not necessarily). The ODA 204 answers the call and then uses the agent ID to reconnect this call to the matching waiting agent.

Figure 6A:
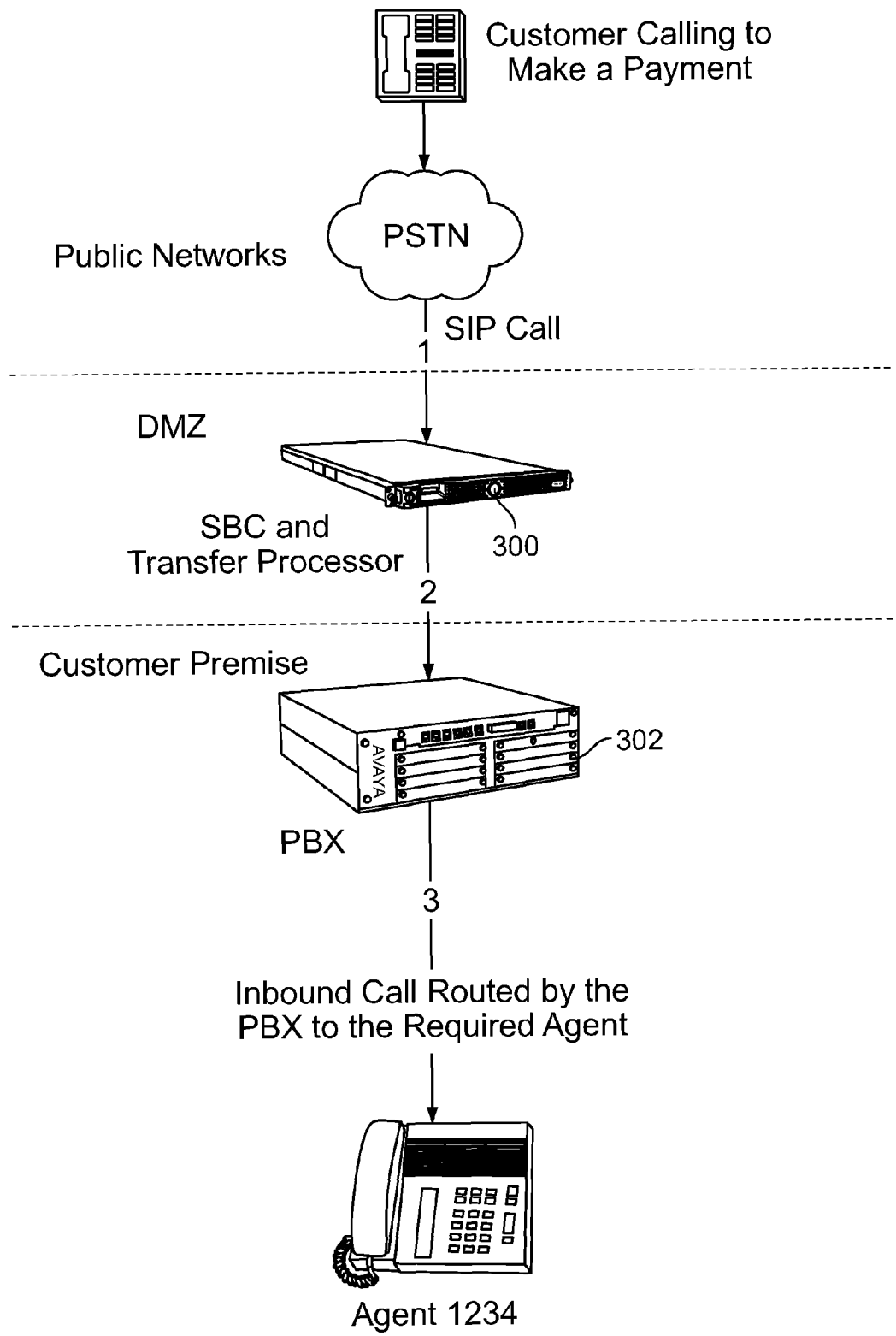
FIGS. 6A, 6B, 6C, 6D, 6E, 6F, and 6G are schematic diagrams illustrating the general configuration and mode of operation of a system according to a second exemplary implementation of the present invention.

Referring to FIG. 6A of the drawings, an alternative exemplary implementation is similar in many respects to that described above. However, in this case, inbound external SIP calls are presented by the PSTN to an SBC (Session Border Control) 300 in a known manner, and the SBC 300 routes inbound calls onto the PBX 302. As before, the PBX 302 routes inbound calls to agents.

Figure 6B:
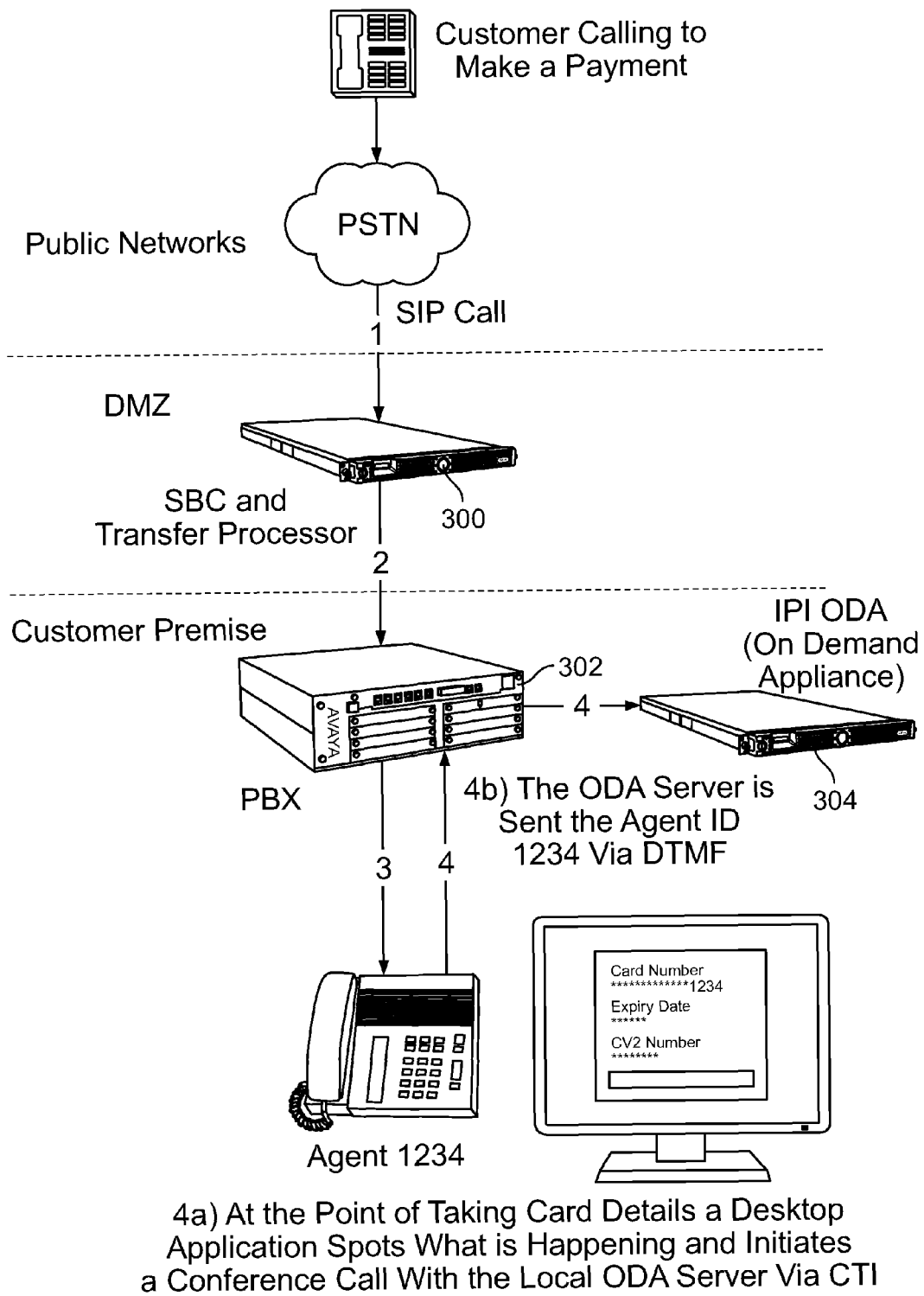

The agent handles the call in a usual manner up to the point where they are ready to accept payment from the caller. At this point, and referring to FIG. 6B of the drawings, a CTI enabled desktop application identifies the agent activity and, using CTI, initiates a conference call to an on-site On Demand Appliance (ODA) 304 according to an exemplary embodiment of the present invention. The ODA 304 answers the call and expects data representative of an agent ID in the form of DTMF or other means, to allow it to identify the user; this is sent automatically to the desktop application.

Figure 6C:
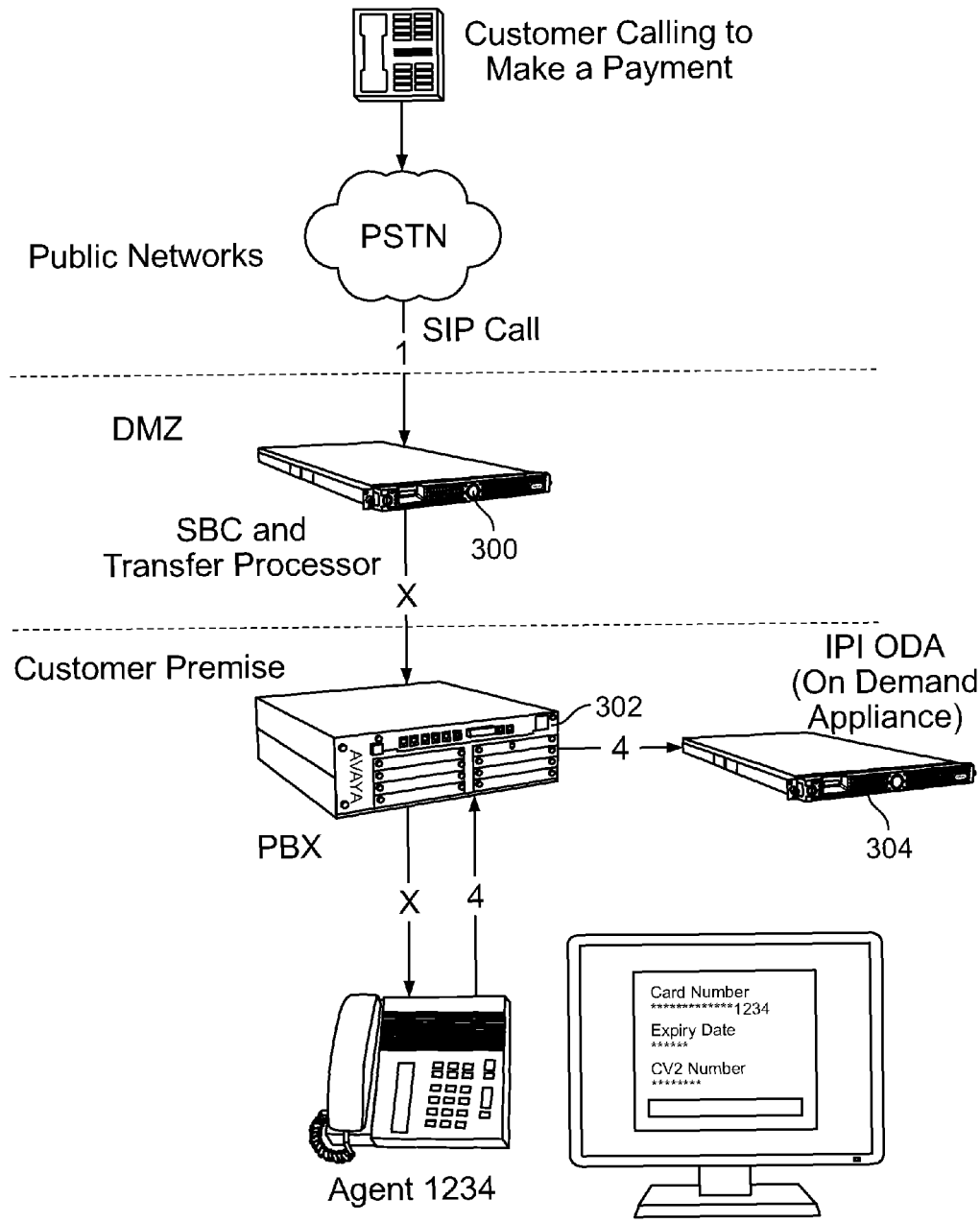

Referring to FIG. 6C of the drawings, the desktop application puts a sequence of DTMF on the line, which is recognised by the SBC 300 as a take back and transfer request. The links from the SBC 300 to the PBX 302 and from the PBX 302 to the agent are dropped, but the agent call to the ODA 304 remains active, keeping the agent ready for when the call is re-presented.

Figure 6D:
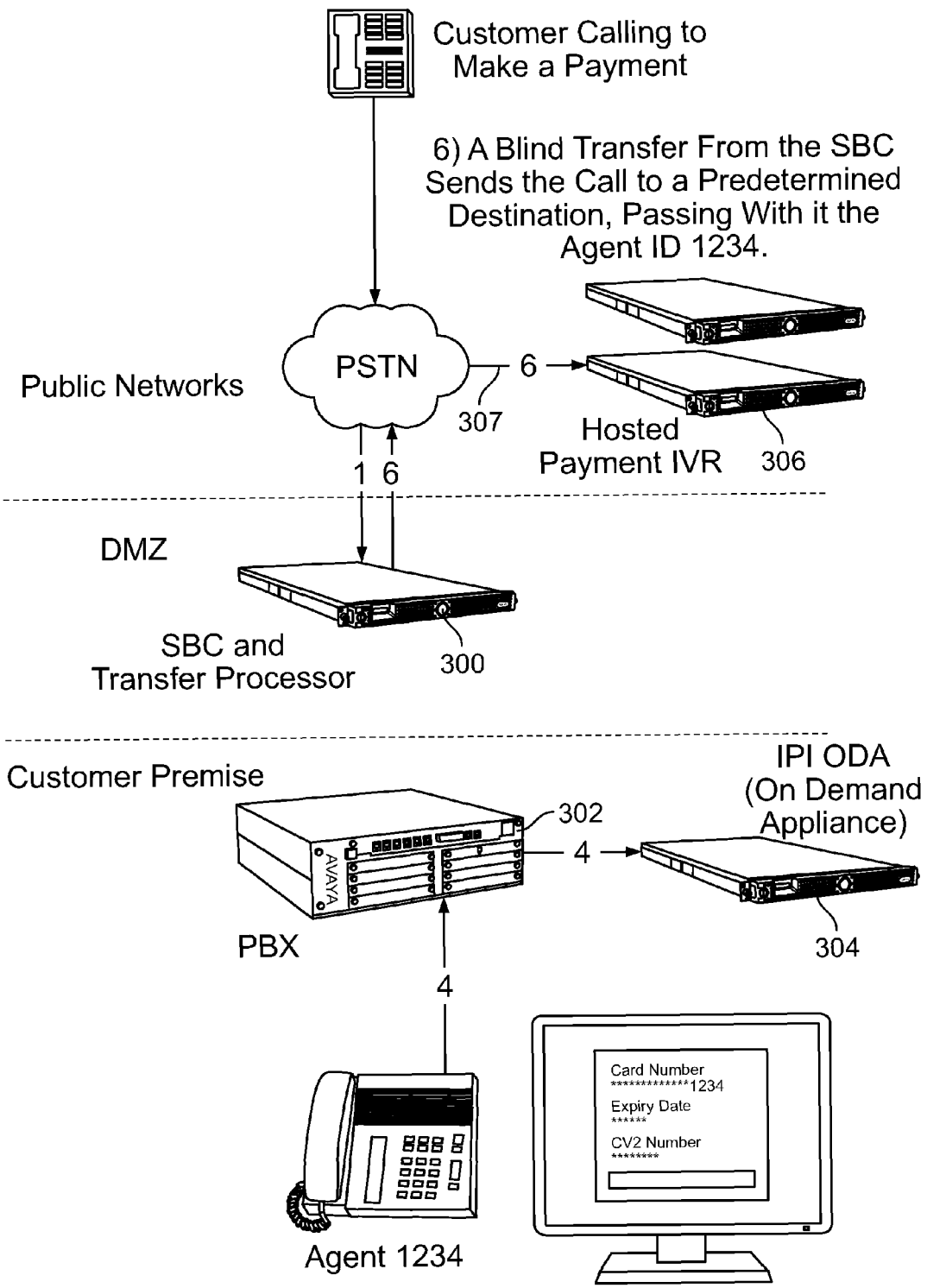
Figure 6E:
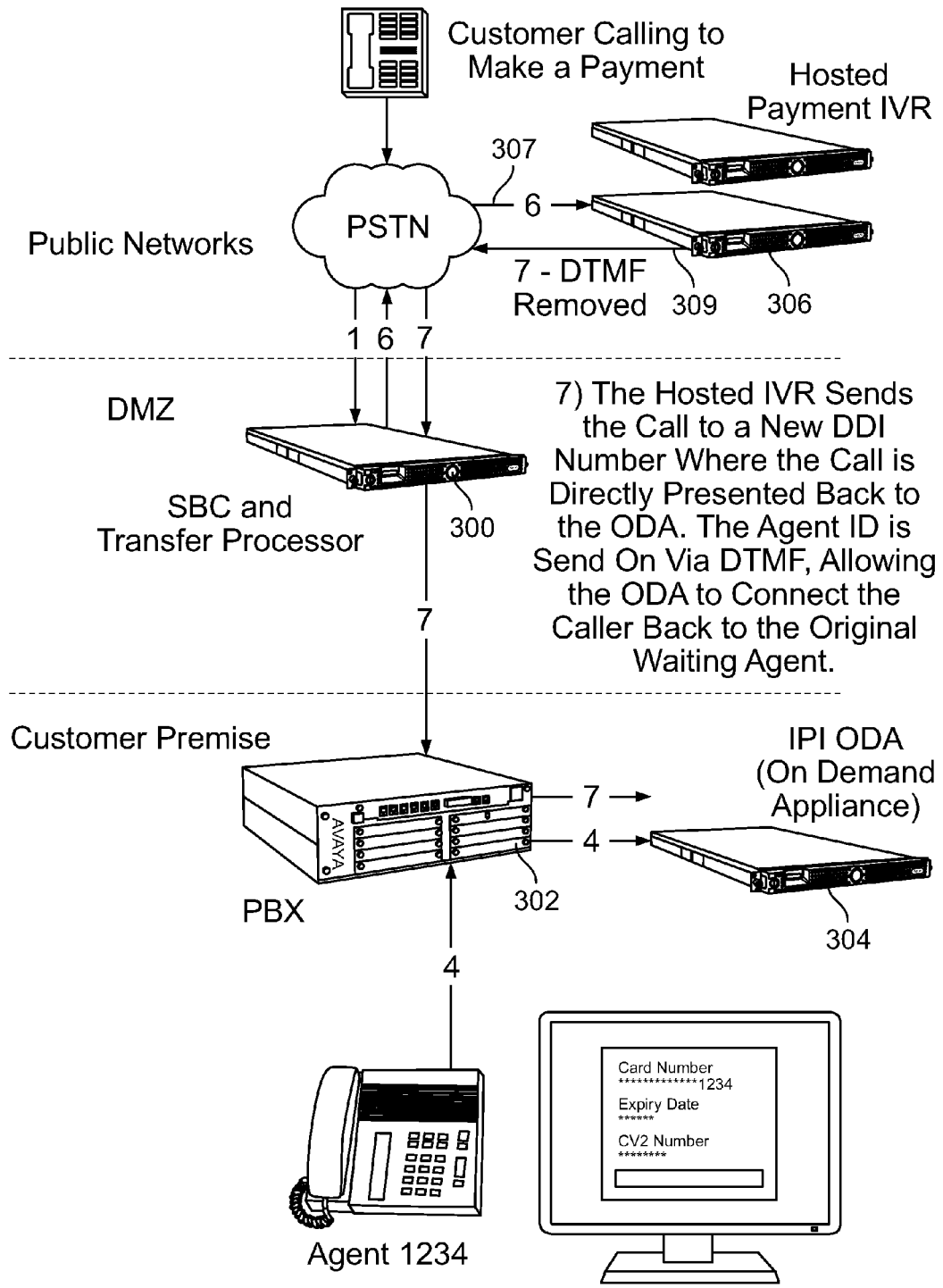

Referring to FIG. 6D, the call will be 'blind' transferred by the SBC 300 to a preconfigured DDI number, which presents the call 307 to the hosted IVR platform 306, which answers the call and is presented with the original agent ID via DTMF. Referring to FIG. 6E, the hosted IVR 306 creates a new call 309 back to the call centre, but this time on a separate DDI that is routed directly by the PBX 302 to the ODA 304. The ODA 304 answers the call and the hosted IVR 306 sends the original agent ID via DTMF. The ODA matches the agent ID to the other call leg with matching agent ID and creates a two-party conference, as in the previous example, allowing the agent and customer to talk freely. All customer entered DTMF (from the customer to the IVR via line 307) is removed at the hosted IVR level, allowing the contact centre itself to remain outside of PCI scope.

Figure 6F:
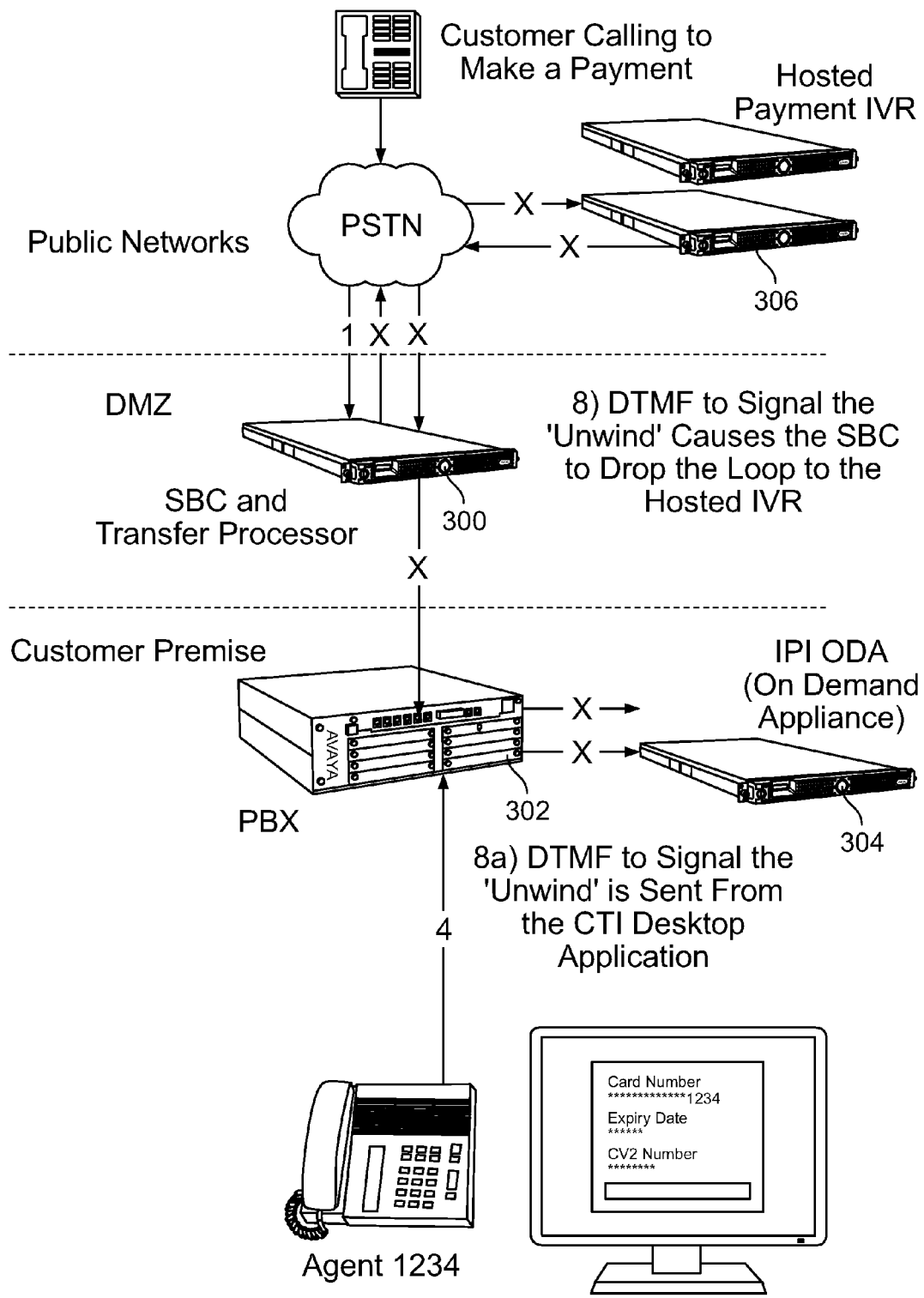

Once the transaction is complete, and referring to FIG. 6F of the drawings, the call may end, but should the call need to continue or the caller needs to be transferred to another agent or passed to an automated system, the system is configured to cause the call to 'unwind' from the hosted payment IVR 306, which is filtering out DTMF and utilising multiple SIP trunks. The agent may initiate the 'unwind' using a button on the CTI desktop application or this could be automated by the CTI application identifying that the transaction has been completed. Either way, the desktop application may put a sequence of DTMF on the line to signal the unwind, and the SBC may detect the signal and drop the call looping via the hosted IVR 306.

Figure 6G:
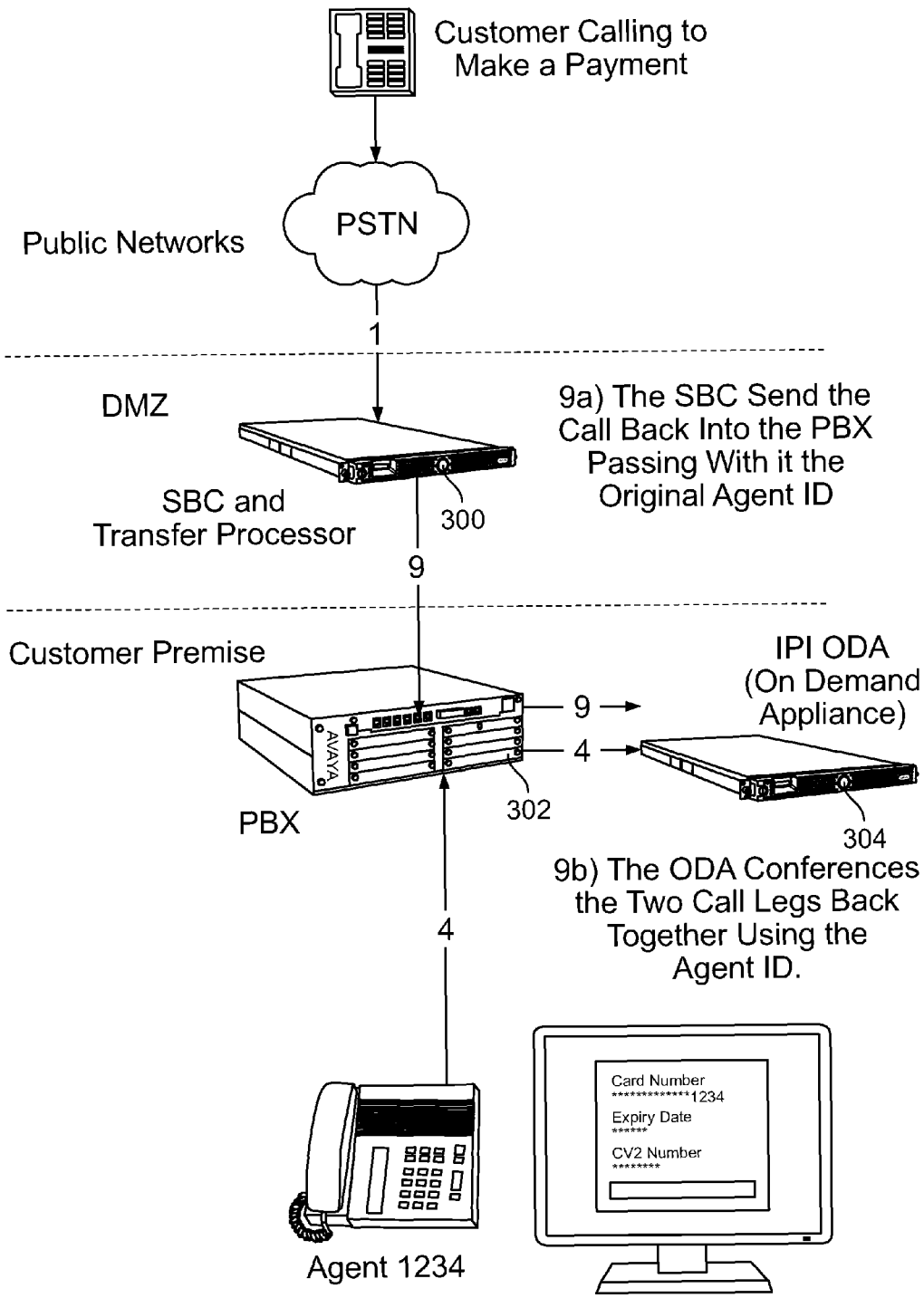

Finally, and referring to FIG. 6G of the drawings, the SBC sends the call back to the PBX on a DDI that will be routed directly onto the ODA 304 (this can be the same DDI that was used for the original call to the ODA, but not necessarily), and the ODA 304 answers the call and then uses the agent ID sent to it via DTMF to reconnect this call to the matching waiting agent. The call will remain in this state until finished, unless further payments are required, then the above-mentioned steps can be repeated to reconnect to the hosted payment IVR 306.

Figure 7A:
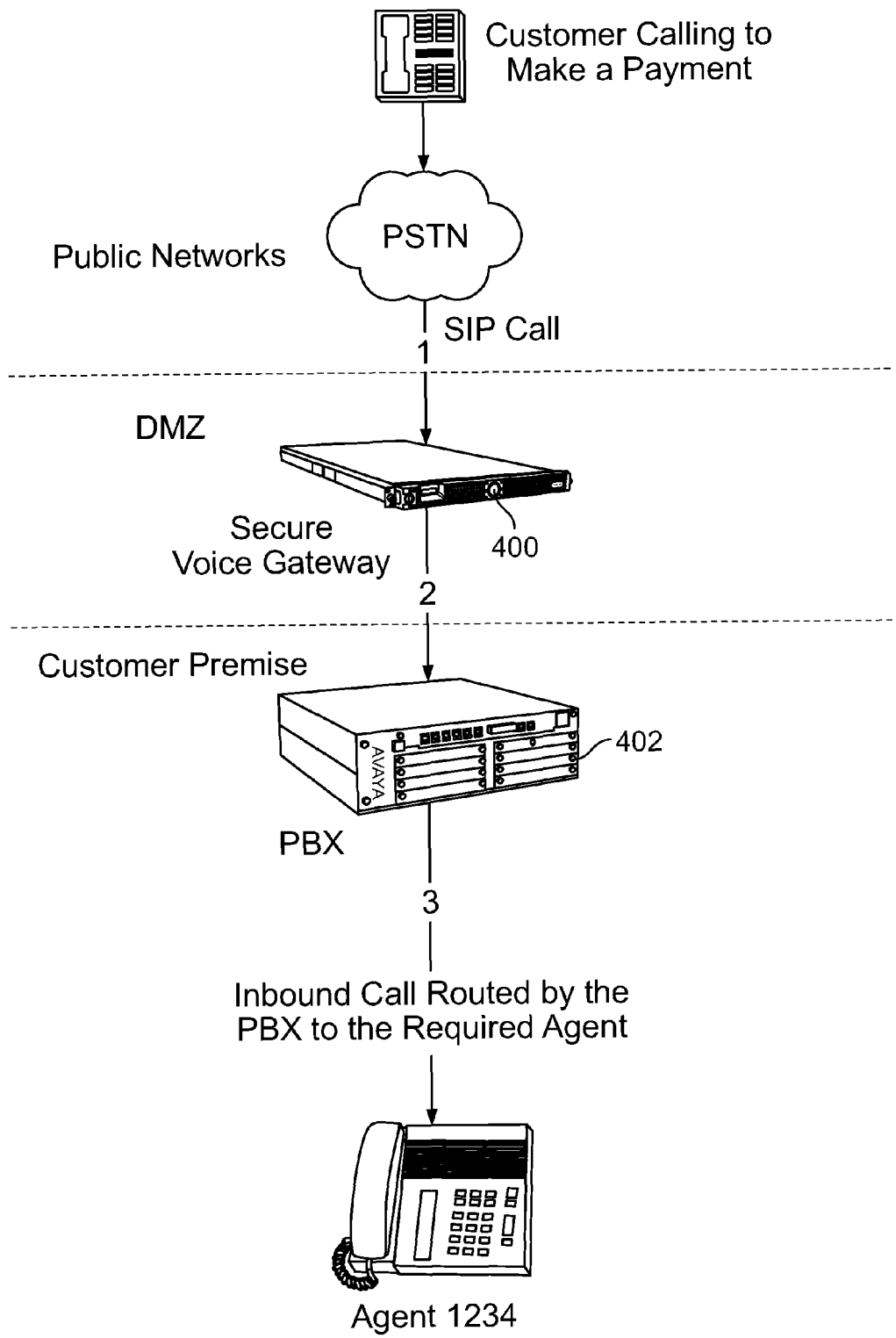
FIGS. 7A, 7B, 7C, 7D, and 7E are schematic diagrams illustrating the general configuration and mode of operation of a system according to a third exemplary implementation of the present invention.

Referring to FIG. 7A of the drawings, yet another exemplary implementation is similar in many respects to those described above. Inbound external SIP calls are presented by the PSTN to an SBC (Session Border Control) or secure voice gateway 400 in a known manner, and the gateway 400 routes inbound calls onto the PBX 402. As before, the PBX 402 routes inbound calls to agents.

Figure 7B:
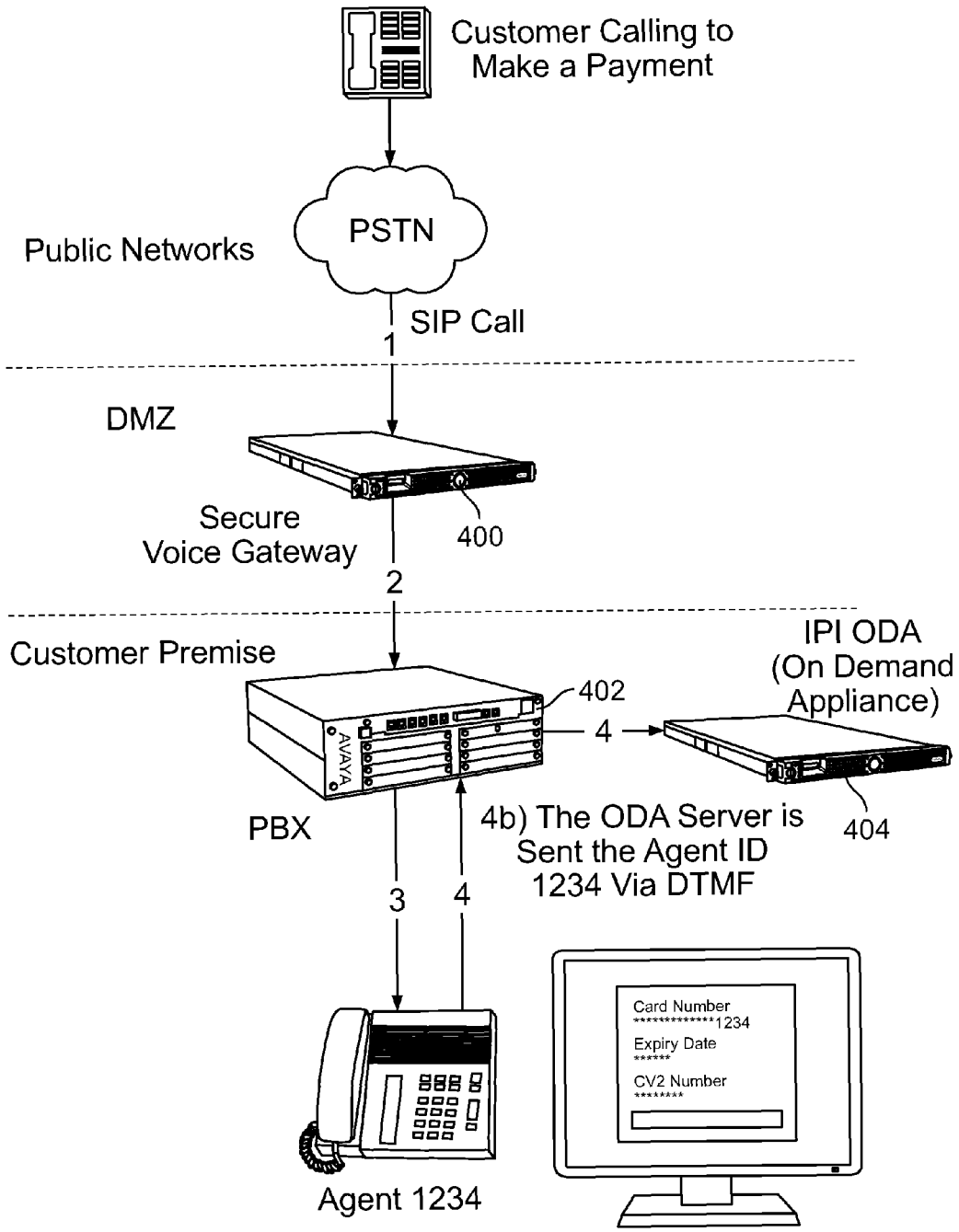

The agent handles the call in a usual manner up to the point where they are ready to accept payment from the caller or, more generally, is required to interact with a hosted platform of some type. At this point, and referring to FIG. 7B of the drawings, a CTI enabled desktop application identifies the agent activity and, using CTI, initiates a conference call to an on-site On Demand Appliance (ODA) 404 according to an exemplary embodiment of the present invention. The ODA 404 answers the call and expects data representative of an agent ID in the form of DTMF or other means, to allow it to identify the user; this is sent automatically to the desktop application.

Figure 7C:
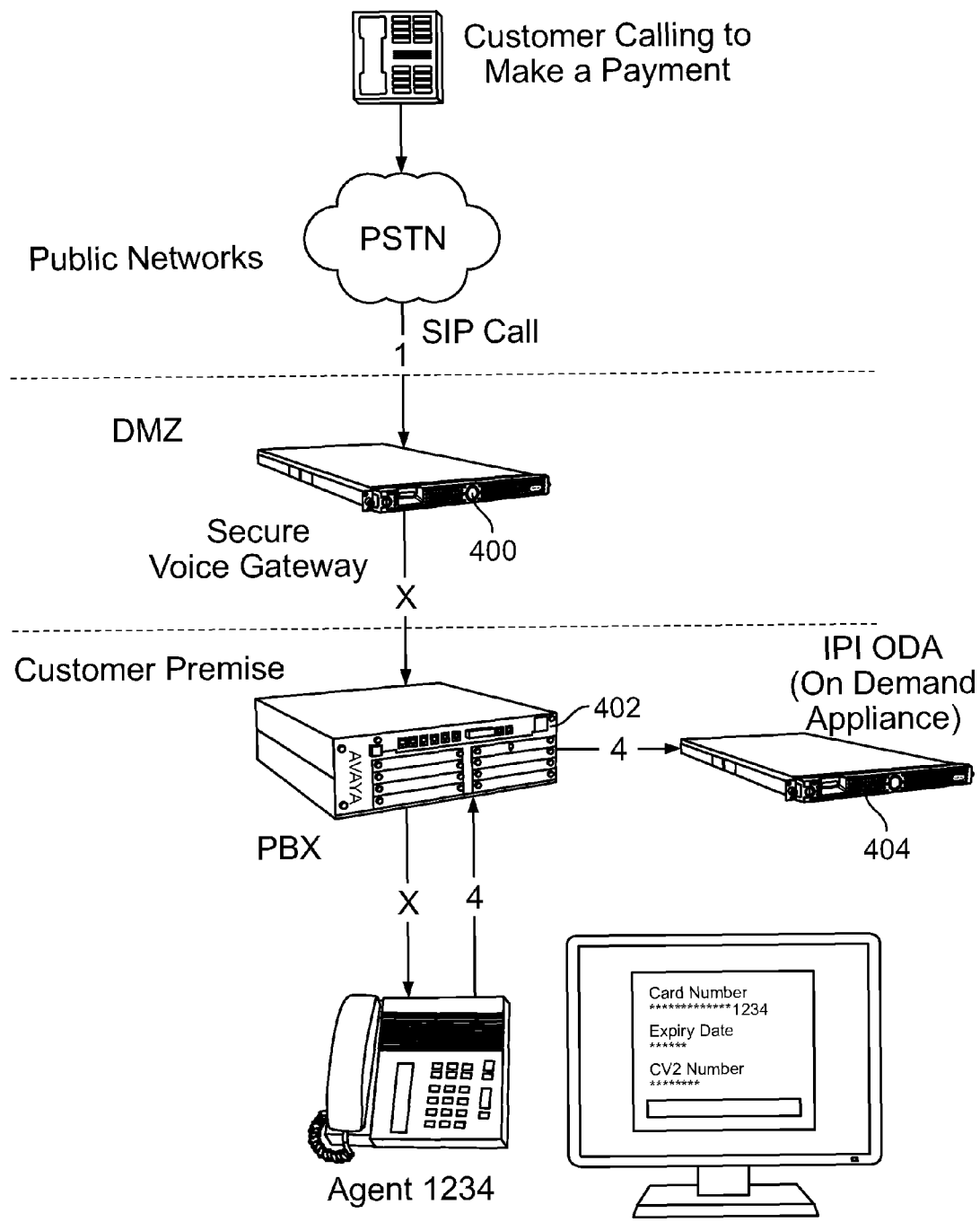

Referring to FIG. 7C of the drawings, the desktop application puts a sequence of DTMF on the line, which is recognised by the gateway 400 as a take back and transfer request. The links from the gateway 400 to the PBX 402 and from the PBX 402 to the agent are dropped, but the agent call to the ODA 404 remains active, keeping the agent ready for when the call is re-presented.

Figure 7D:
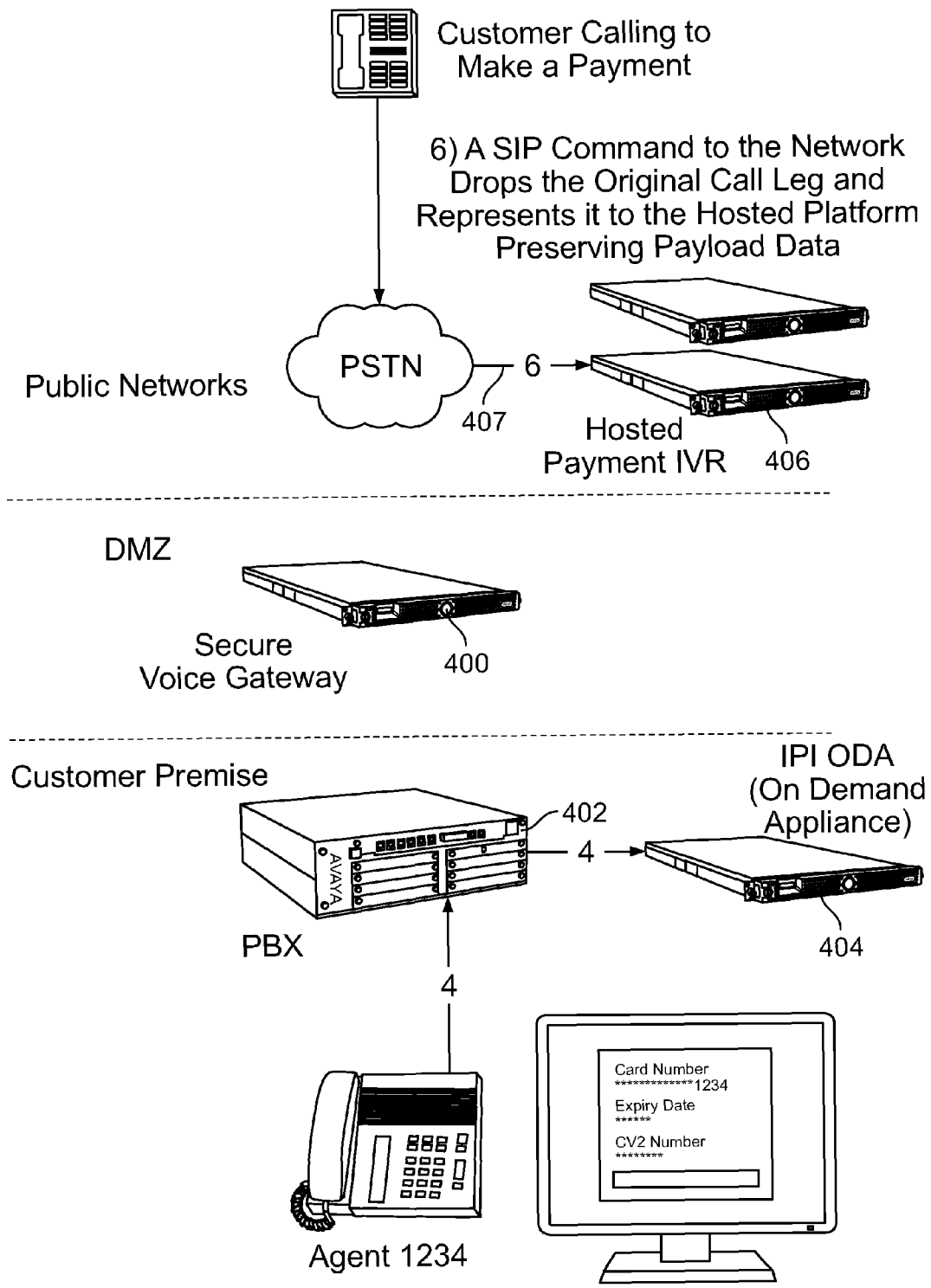
Figure 7E:
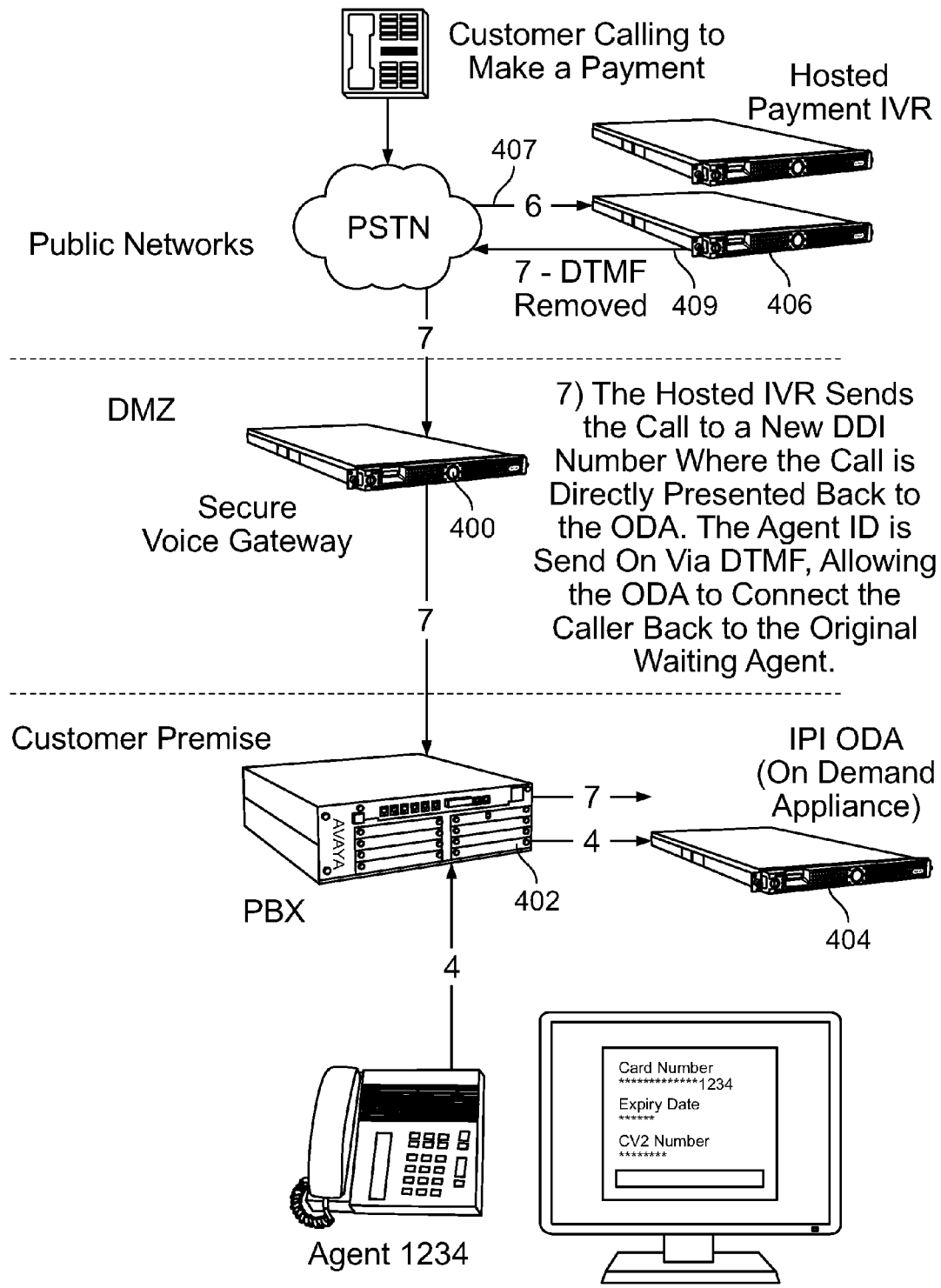

Referring to FIG. 7D, the call will be 'blind' transferred by the gateway 400 to a preconfigured DDI number, which presents the call 407 to the hosted IVR platform 406, which answers the call and is presented with the original agent ID via DTMF. In this case, in contrast to the previously-described embodiment, both of the call legs between the PSTN and the gateway 400 have been dropped, thereby avoiding the 'tromboning' aspect of the previous embodiment. Referring to FIG. 7E, the hosted IVR 406 creates a new call 409 back to the call centre, but this time on a separate DDI that is routed directly by the PBX 402 to the ODA 404. The ODA 404 answers the call and the hosted IVR 406 sends the original agent ID via DTMF. The ODA matches the agent ID to the other call leg with matching agent ID and creates a two-party conference, as in the previous example, allowing the agent and customer to talk freely. All customer entered DTMF (from the customer to the IVR via line 407) is removed at the hosted IVR level, allowing the contact centre itself to remain outside of PCI scope.

As before, once the transaction is complete, the call may end, but should the call need to continue or the caller needs to be transferred to another agent or passed to an automated system, the system is configured to cause the call to 'unwind' from the hosted payment IVR 406, which is filtering out DTMF and utilising multiple SIP trunks. The agent may initiate the 'unwind' using a button on the CTI desktop application or this could be automated by the CTI application identifying that the transaction has been completed. Either way, the desktop application may put a sequence of DTMF on the line to signal the unwind, and the gateway may detect the signal and drop the call looping via the hosted IVR 406.

Finally, the gateway sends the call back to the PBX on a DDI that will be routed directly onto the ODA 404 (this can be the same DDI that was used for the original call to the ODA, but not necessarily), and the ODA 404 answers the call and then uses the agent ID sent to it via DTMF to reconnect this call to the matching waiting agent. The call will remain in this state until finished, unless further payments are required, then the above-mentioned steps can be repeated to reconnect to the hosted payment IVR 406.

Figure 8A:
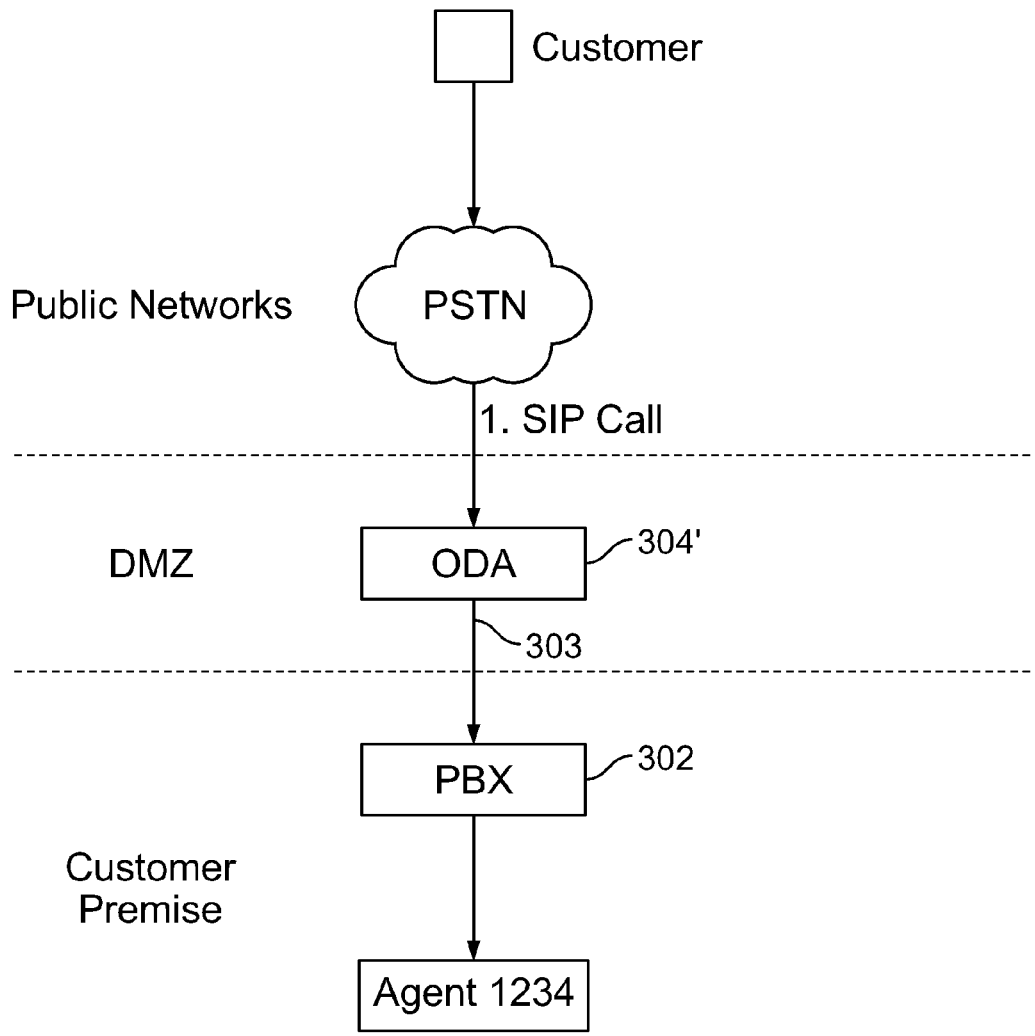
FIGS. 8A, 8B, 8C, and 8D are schematic diagrams illustrating the general configuration and mode of operation of a system according to a fourth exemplary embodiment of the present invention.

Referring to FIG. 8A of the drawings, yet another exemplary embodiment of the invention is similar in some respects to that described in relation to FIGS. 6A to 6E of the drawings. However, in this case, the SBC and the on-site ODA are omitted and, instead, an On Demand Appliance (ODA) 304' is provided off-site. Thus, inbound external calls are presented by the PSTN to the ODA 304' and the ODA 304' routes inbound calls onto the PBX 302. As before, the PBX 302 routes inbound calls to agents.

Figure 8B:
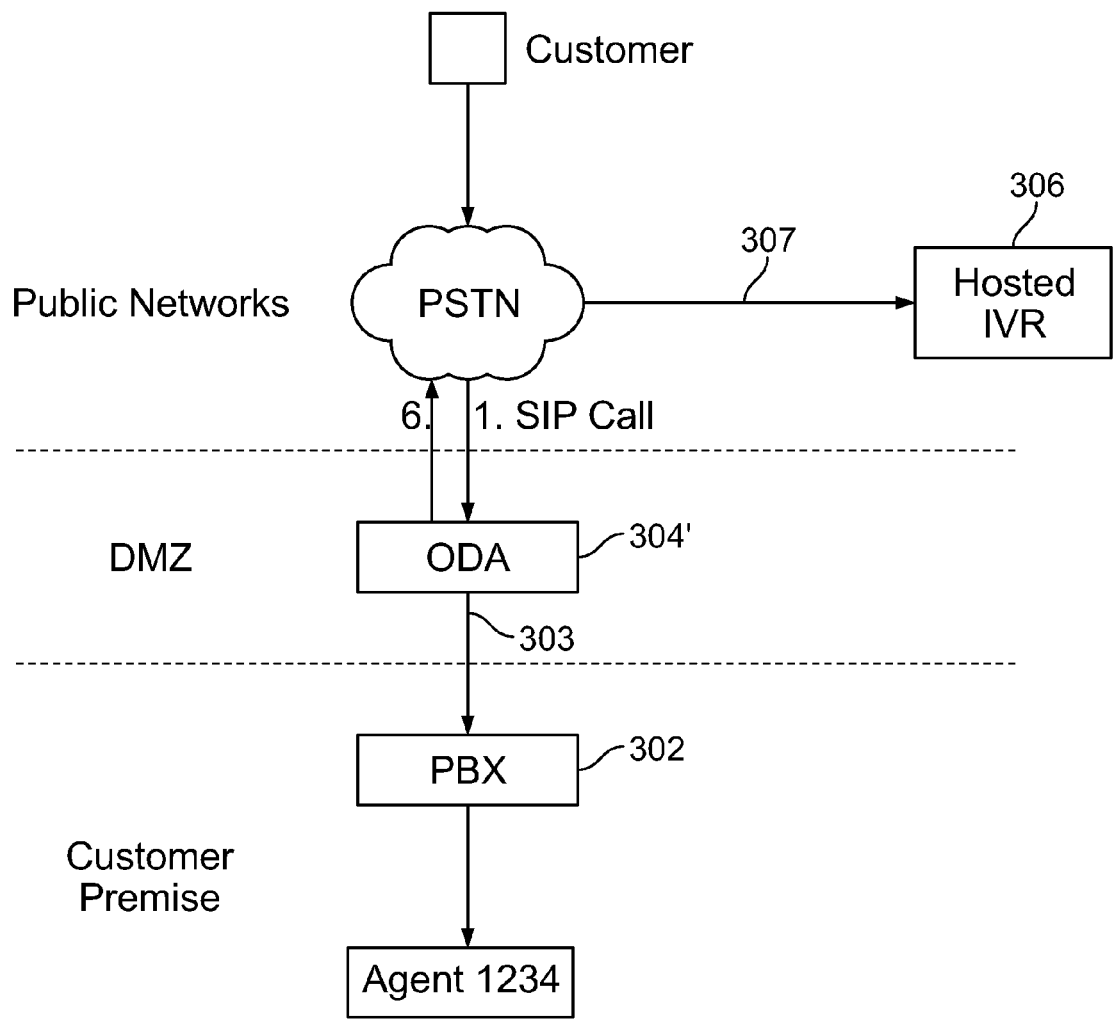
Figure 8C:
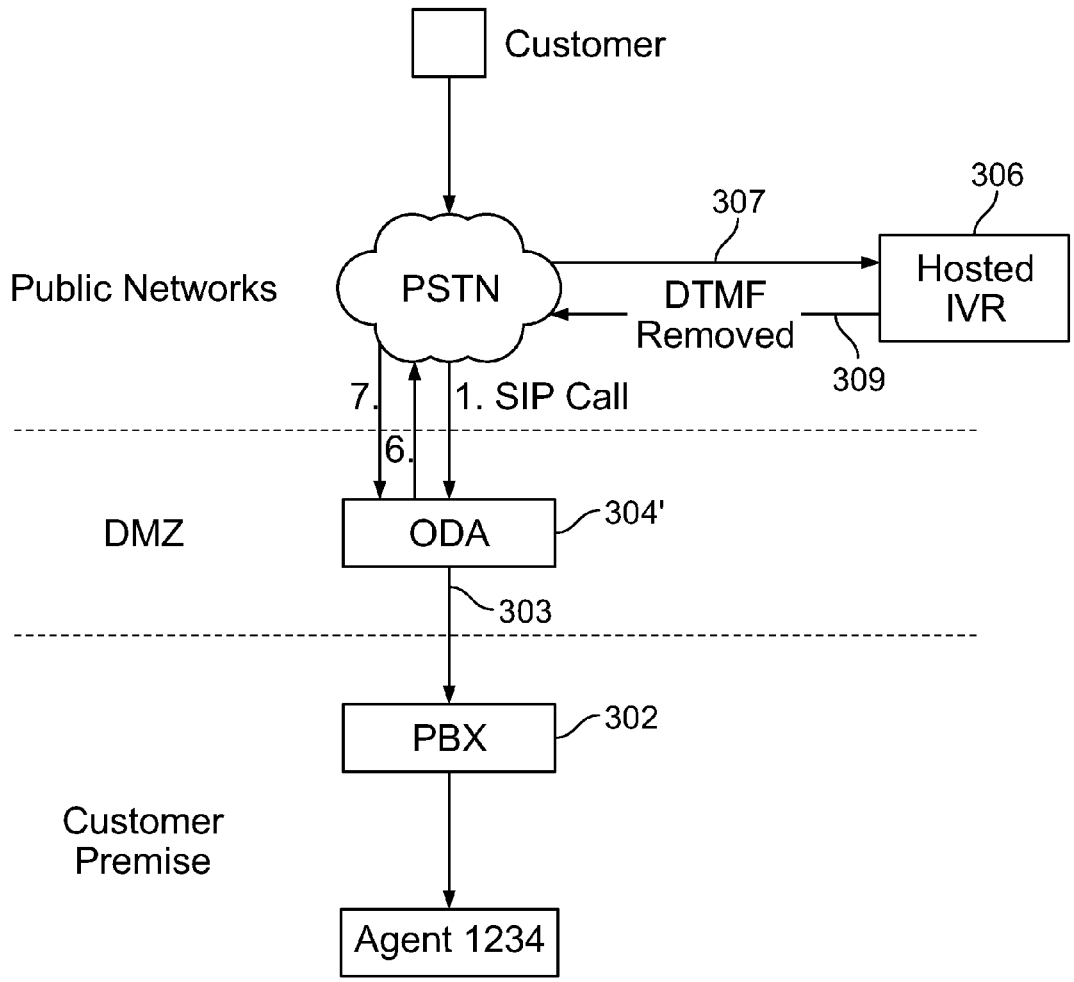

The agent handles the call in a usual manner up to the point where they are ready to (for example) accept payment from the caller. At this point, a DTMF code is sent from the agent workstation for detection by the ODA 304', and the call 303 between the ODA 304' and the PBX 302/agent remains connected. Referring to FIG. 8B of the drawings, the ODA 304' sets up a call 307 to the hosted IVR 306 using, for example, a SIP re-invite or refer. Next, and referring to FIG. 8C of the drawings, the hosted IVR 306 creates a new call 309 to a new DDI number, that is directly presented back to the ODA 304', allowing the ODA 304' to connect the caller back to the original waiting agent (via the retained call leg 303). Thus, the agent and the caller can continue to talk freely, whilst all customer entered DTMF (from the customer to the IVR 306 via line 307) is removed at the hosted IVR level, allowing the contact centre itself to remain outside of PCI scope.

Figure 8D:
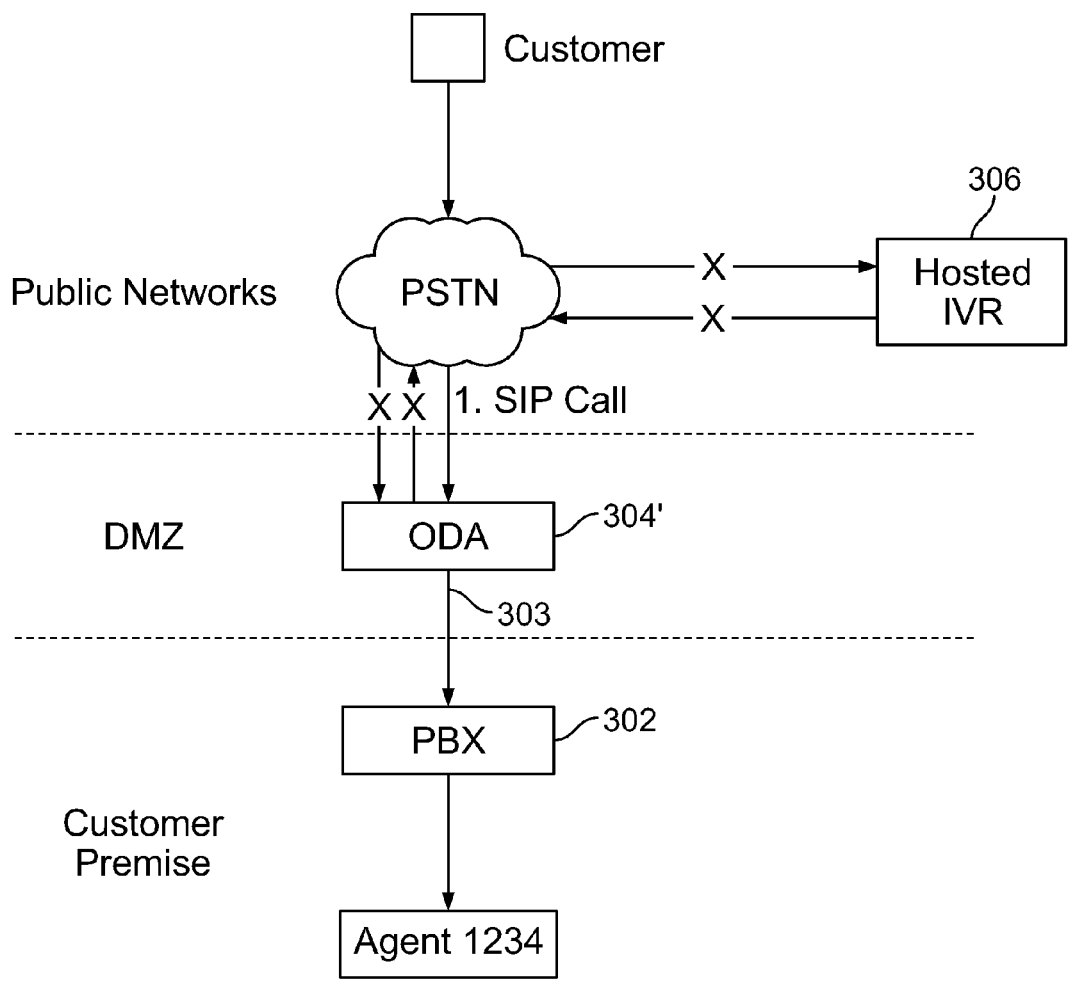

Once the transaction is complete, and referring to FIG. 8D of the drawings, the call may end, but should the call need to continue or the caller needs to be transferred to another agent or passed to an automated system, the system is configured to cause the call to 'unwind' from the hosted payment IVR 306. The agent may initiate the 'unwind' using a button on the CTI desktop application or this could be automated by the CTI application identifying that the transaction has been completed. Either way, the desktop application puts a sequence of DTMF on the line 303 to signal the 'unwind' and the ODA 304' detects the signal and drops the call leg going via the hosted IVR 306 and re-establishes the voice media on the existing control circuit. The call (between the customer and the agent) will remain in this state until finished, unless further payments are required, in which case the above-mentioned steps can be repeated to reconnect to the hosted payment IVR 306.

Thus, exemplary embodiments of the present invention provide significant technical advantages relative to prior art systems. Ultimately, exemplary embodiments of the present invention work to achieve two principal objectives, namely descoping a contact centre from PCI compliance requirements in the case of a hosted payment platform; and, more generally, eliminating the need for one-to-one mapping of hosted applications to incoming calls. Thus, the need for large, inefficient hardware/software deployments either on premise or within a hosted environment is eliminated. The substantial reduction in hardware and software results in significant cost benefits, as well as a reduction in carbon footprint and energy requirements. Overall, exemplary embodiments of the invention operates to optimise resources in a contact centre environment, whilst maintaining, not only data security, but also the integrity of the contact centre MIS statistics even though additional 'calls' may have been made during a transaction which, in a conventional environment, would distort agent and contact centre reporting. Many of these benefits are achieved by 'holding' the agent call whilst the incoming call is 'redirected' to a hosted platform and then back to the agent.

It will be appreciated by a person skilled in the art, from the foregoing description, that modifications and variations can be made to the described embodiments without departing from the scope of the invention as defined in the appended claims.

What is claimed is:

1. A telephone call processing apparatus for a telephone system comprising an exchange for receiving incoming telephone calls and switching said incoming telephone calls to selected respective agent workstations, the apparatus comprising:
   a routing function for connecting an incoming call from a caller to an agent workstation, and initiating a call from said apparatus to an external application platform, said call including data to enable a transaction call to be set up between said caller and said external application platform;
   a holding function for maintaining a call leg connection with said agent workstation whilst said call from said apparatus to said external application platform is initiated; and
   a connection function for connecting a new call from said external application platform to said agent workstation and establishing or maintaining said call leg connection between said caller and said agent workstation for use whilst said transaction call is connected.

2. The apparatus according to claim 1, wherein said routing function is provided by an on demand application module located remotely from said exchange and said agent workstations.

3. The apparatus according to claim 2, wherein said on demand application module is configured to set up said transaction call and maintain a call leg between said on demand application module and said agent workstation whilst said transaction call is set up.

4. The apparatus according to claim 2, wherein said on demand application module is configured to receive said new call from said external application platform in response to said transaction call and connect said external application platform to said agent workstation.

5. The apparatus according to claim 1, comprising an on demand application module for joining together at least two call legs.

6. The apparatus according to claim 1, wherein said routing function is further configured to cause said incoming call to be terminated, whilst retaining said call leg connection between said apparatus and said agent workstation.

7. The apparatus according to claim 1, wherein said initiated call from said apparatus to said external application platform includes ID data representative of said agent workstation.

8. The apparatus according to claim 1, configured to receive data representative of an interaction between said caller and said external application platform to provide said data to said agent workstation.

9. The apparatus according to claim 8, wherein said data representative of said interaction between said caller and said external application platform comprises selected portions of data configured to maintain security of said interaction data.

10. The apparatus according to claim 9, wherein said interaction data is provided by said caller to said external application platform in a form of DTMF and said data representative of said interaction excludes said DTMF.

11. The apparatus according to claim 1, configured to initiate said call from said apparatus to said external application platform in response to receipt of an initiation signal indicative that an interaction between said caller and said external application platform is required.

12. The apparatus according to claim 1, configured, when an interaction between said caller and said external application platform has concluded, to resume control of the connection between said caller and said external application platform and route said call back to said agent workstation.

13. A telephone system for a telephone system comprising:
   an exchange;
   a plurality of agent workstations; and
   an apparatus, comprising:
      a routing function for connecting an incoming call from a caller to an agent workstation, and initiating a call from said apparatus to an external application platform, said call including data to enable a transaction call to be set up between said caller and said external application platform;
      a holding function for maintaining a call leg connection with said agent workstation whilst said call from said apparatus to said external application platform is initiated; and
      a connection function for connecting a new call from said external application platform to said agent workstation and establishing or maintaining said call leg connection between said caller and said agent workstation for use whilst said transaction call is connected.

14. The system according to claim 13, wherein, in response to said connection of said incoming call thereto, an agent workstation is configured to place an apparatus call to said apparatus to establish said call leg connection therebetween; and
   wherein, in response to receipt of a control signal, said agent workstation is configured to place said apparatus call to said apparatus to establish said call leg connection therebetween.

15. The system according to claim 14, wherein said control signal is generated in response to a user action.

16. The system according to claim 14, comprising a work flow monitor associated with said agent workstation, wherein said work flow monitor is configured to monitor progress of a work flow in respect of a respective agent workstation and, at an appropriate point therein, generate said control signal.

17. The system according to claim 13, wherein said external application platform initiates said new call back to said apparatus and transmits data representative of an interaction between said caller and said external application platform to said agent workstation; or
   wherein said external application platform is configured to exclude selected features of original said interaction data for transmission to said apparatus, so as to maintain security thereof.

18. The system according to claim 13, wherein said apparatus is configured, when an interaction between said caller and said external application platform has concluded, to resume control of a connection between said caller and said external application platform and route said call back to said agent workstation.

19. A method for telephone call processing in a telephone system comprising an exchange for receiving incoming telephone calls and switching said incoming telephone calls to selected respective agent workstations, the method comprising:
   connecting an incoming call from a caller to an agent workstation, and initiating a call from said apparatus to an external application platform, said call including data to enable a transaction call to be set up between said caller and said external application platform;
   maintaining a call leg connection with said agent workstation whilst said call from said apparatus to said external application platform is initiated; and
   connecting a new call from said external application platform to said agent workstation and establishing or maintaining said call leg connection between said caller and said agent workstation for use whilst said transaction call is connected.

20. The method according to claim 19, further comprising causing said incoming call to be terminated, whilst retaining said call leg connection between said apparatus and said agent workstation.

* * * * *